United States Patent
Gamache et al.

(10) Patent No.: US 9,341,786 B1
(45) Date of Patent: May 17, 2016

(54) OPTOMECHANICAL ASSEMBLY FOR A PHOTONIC CHIP

(71) Applicant: Lumentum Operations LLC, Milpitas, CA (US)

(72) Inventors: Claude Gamache, Gatineau (CA);
Adonios Bitzanis, Ottawa (CA);
Michael Ayliffe, Ottawa (CA)

(73) Assignee: Lumentum Operations LLC, Milpitas, CA (US)

( * ) Notice: Subject to any disclaimer, the term of this patent is extended or adjusted under 35 U.S.C. 154(b) by 0 days.

(21) Appl. No.: 14/810,880

(22) Filed: Jul. 28, 2015

(51) Int. Cl.
| | |
|---|---|
| G02B 6/12 | (2006.01) |
| G02F 1/035 | (2006.01) |
| H01L 33/00 | (2010.01) |
| H01S 5/00 | (2006.01) |
| G02B 6/30 | (2006.01) |
| G02B 6/124 | (2006.01) |
| G02B 6/34 | (2006.01) |
| G02B 6/32 | (2006.01) |
| G02B 6/38 | (2006.01) |
| G02B 6/27 | (2006.01) |

(52) U.S. Cl.
CPC *G02B 6/30* (2013.01); *G02B 6/124* (2013.01); *G02B 6/2726* (2013.01); *G02B 6/32* (2013.01); *G02B 6/34* (2013.01); *G02B 6/3893* (2013.01); *G02B 2006/12061* (2013.01); *G02B 2006/12104* (2013.01); *G02B 2006/12142* (2013.01); *G02B 2006/12164* (2013.01)

(58) Field of Classification Search
CPC  G02B 6/12004; G02B 6/4214; G02F 1/2255; G02F 1/255; G02F 1/025; H01L 33/005
USPC .................... 385/2–14; 438/27, 65
See application file for complete search history.

(56) References Cited

U.S. PATENT DOCUMENTS

| | | | |
|---|---|---|---|
| 7,162,124 B1 | 1/2007 | Gunn, III et al. | 385/37 |
| 7,366,380 B1 | 4/2008 | Peterson et al. | 385/47 |
| 7,900,836 B2 * | 3/2011 | Moon | G06K 7/12 235/454 |
| 8,064,745 B2 | 11/2011 | Fortusini et al. | 385/37 |
| 8,213,751 B1 * | 7/2012 | Ho | G02B 6/305 385/1 |
| 8,317,411 B2 | 11/2012 | Fujiwara et al. | 385/92 |
| 8,615,149 B2 | 12/2013 | Kim et al. | 385/49 |
| 8,639,073 B2 | 1/2014 | Pelletier et al. | 385/37 |
| 9,054,489 B2 * | 6/2015 | Kim | H01S 5/021 |
| 2003/0067676 A1 * | 4/2003 | Wang | B82Y 20/00 359/344 |
| 2008/0138013 A1 * | 6/2008 | Parriaux | G02B 5/1814 385/37 |
| 2011/0142395 A1 * | 6/2011 | Fortusini | G02B 6/34 385/37 |
| 2015/0087092 A1 * | 3/2015 | Goto | H01L 31/18 438/27 |

OTHER PUBLICATIONS

Chen et al., "Fabrication-Tolerant Waveguide Chirped Grating Coupler for Coupling to a Perfectly Vertical Optical Fiber", IEEE Photonics Technology Letters, vol. 20, No. 23, pp. 1914-1916, Dec. 1, 2008.

* cited by examiner

*Primary Examiner* — Akm Enayet Ullah
(74) *Attorney, Agent, or Firm* — Harrity & Harrity, LLP

(57) ABSTRACT

An optomechanical assembly for a photonic chip is disclosed. The optomechanical assembly may include a planar lightwave circuit optically coupled to a plurality of vertical coupling gratings on the photonic chip, to couple light between an optical connector abutting the planar lightwave circuit and the photonic chip.

23 Claims, 20 Drawing Sheets

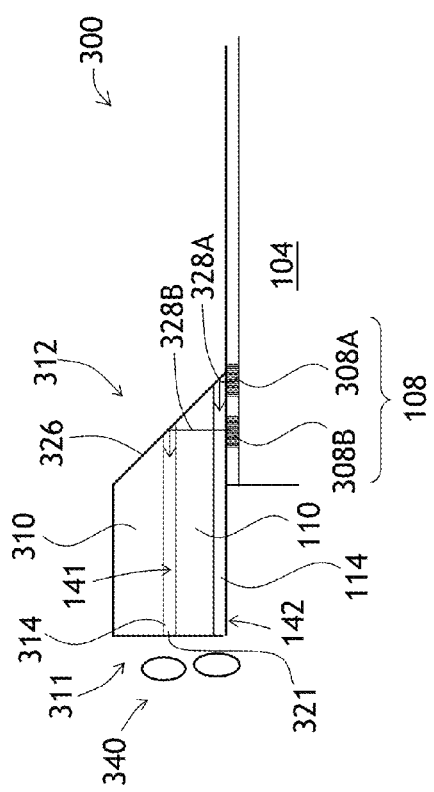
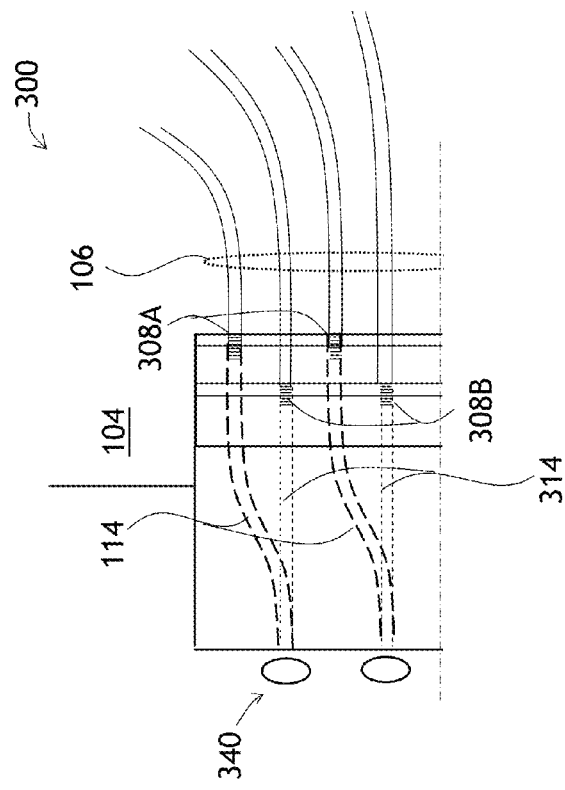

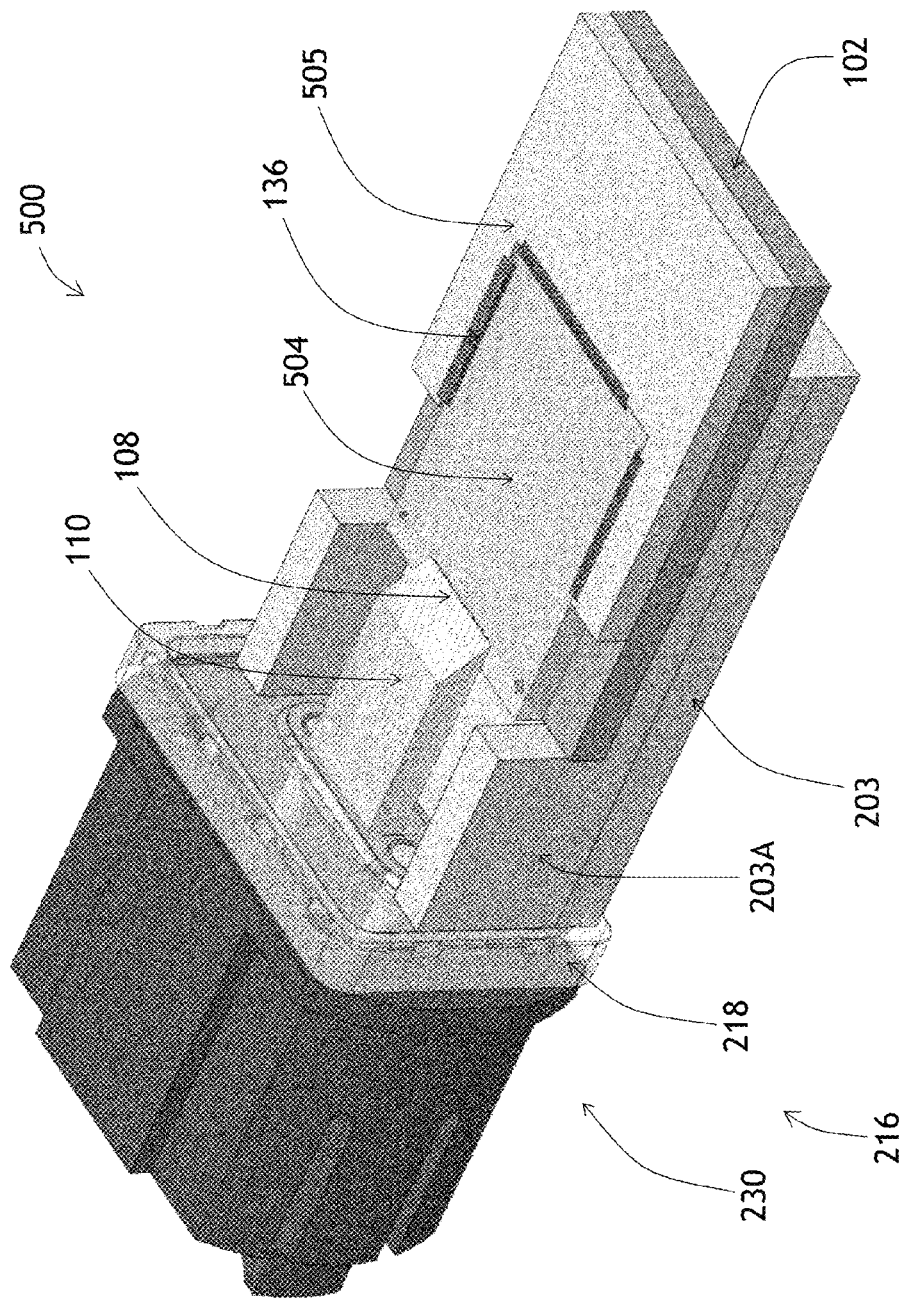

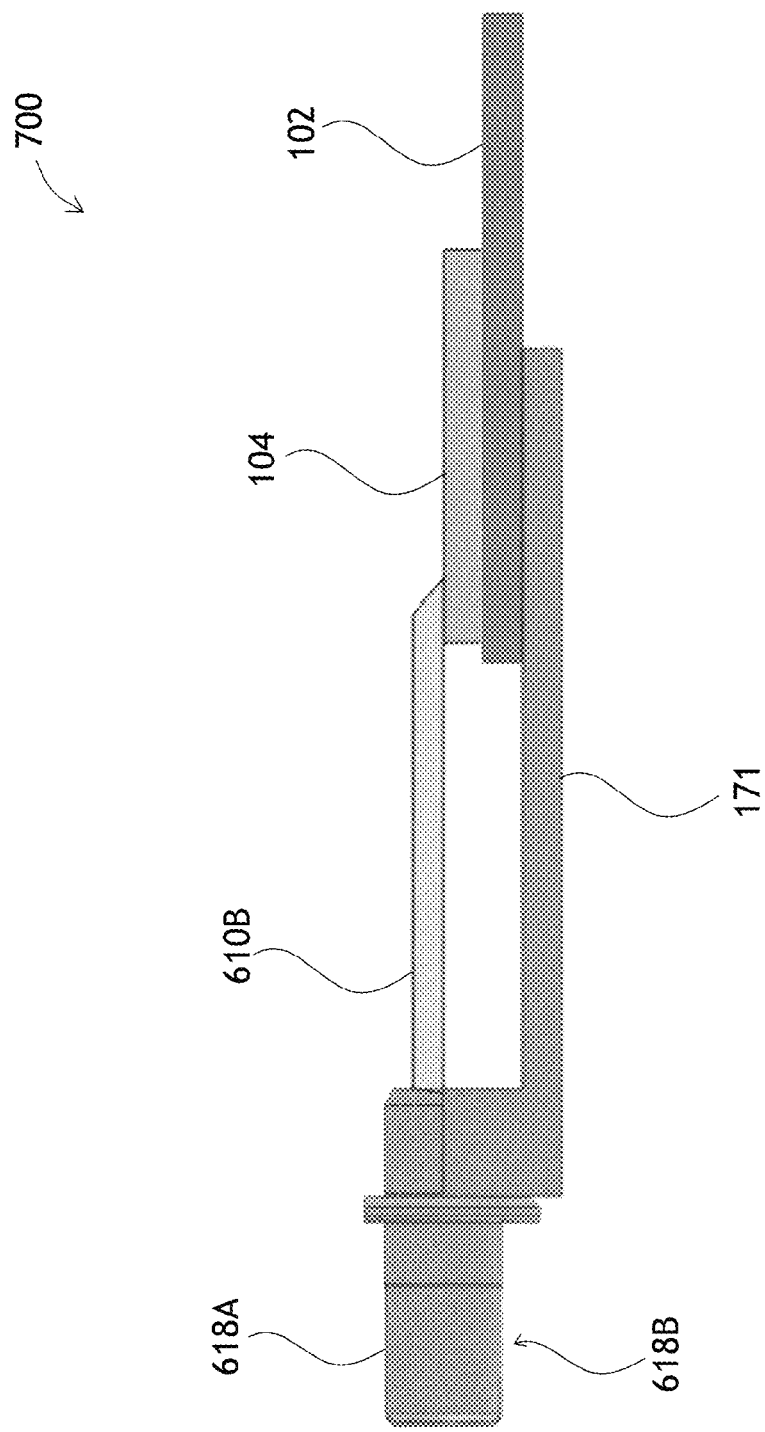

OPTOMECHANICAL ASSEMBLY FOR A PHOTONIC CHIP

TECHNICAL FIELD

The present disclosure relates to optomechanical packaging, and in particular to packaging of electro-optical/optoelectronic assemblies.

BACKGROUND

Miniaturization of optical, electro-optical, and optoelectronic components and modules is reaching a stage where complex optical, electro-optical, and optoelectronic functionalities may be realized on a single semiconductor chip. For example, a semiconductor chip may be patterned with so-called "photonic integrated circuits" including optical waveguides and other micro-optical structures. The photonic integrated circuits may be used for modulation, demodulation, detection, and wavelength separation of optical signals, making them attractive for optical communications systems. The proliferation of microelectronics technology has a potential for integration of photonic chips with electronic circuitry.

Recently, photonic chips have been increasingly used for generation, modulation, demodulation, and reception of light signals in telecommunications networks. Functions such as transmission, reception, and modulation of light have been realized on one or several photonic chips. Despite the progress of optical integration technologies on photonic chips, the task of in-coupling and out-coupling of light between a photonic chip and outside environment remains a significant challenge. The multitude of densely spaced optical inputs and outputs may render coupling of optical fibers difficult.

Several optical interface standards have been developed to provide dense multiport optical connector components. One example of such a standard is a "parallel singlemode 4" (PSM4) optical interface standard, which uses connectorized single mode fiber ribbons to support reaches of at least 500 meters. The fiber ribbons may be connected to optoelectronic devices and modules via arrayed connectors such as, for example, Multi-Fiber Push-On (MPO) connectors. Another example is Coarse Wavelength Division Multiplexer (CWDM) optical interface standard, which uses two single mode fibers to carry four multiplexed wavelengths per fiber. In the CWDM standard, one optical fiber carries upstream optical signals, and the second optical fiber carries downstream optical signals.

Regardless of which multiport optical connector is used to couple an optical device to a fiber array, a task remains of optical coupling of the photonic chip to the optical connector inside the device. Typically, a fiber array is coupled to an edge of a photonic chip where the waveguides of the chip terminate. A more recent optical coupling technology uses so-called vertical coupling gratings, which enable a fiber array to be coupled to a planar surface of the chip at a nearly straight angle.

One potential drawback of fiber array coupling is that a relatively large space, in comparison with the photonic chip size, is required to accommodate the minimal fiber bend radius of the optical fiber. When a side coupling is used, the resulting optomechanical assembly tends to be long due to the requirement to stress relieve optical fibers extending within a package between the photonic chip and a multi-fiber connector. When a vertical coupling is used, the optical fibers extend upwards, resulting in a package height increase.

SUMMARY

In accordance with an aspect of the disclosure, a planar lightwave circuit (PLC) may be used in combination with vertical coupling gratings on a photonic chip to couple light between an optical connector and a photonic chip. Since no fiber ribbons are required, the overall package may be much more compact.

In accordance with an aspect of the disclosure, there is provided an optomechanical assembly comprising:
a substrate;
a photonic chip (PC) supported by the substrate, the photonic chip comprising a plurality of PC optical waveguides and a plurality of vertical coupling gratings, wherein each vertical coupling grating is optically coupled to at least one of the plurality of PC optical waveguides;
a first PLC over the substrate, the first PLC comprising: first and second ends; at least one optical port at the first end; and a first plurality of PLC optical waveguides optically coupled to the at least one optical port and extending to the second end, wherein each one the first plurality of PLC optical waveguides is optically coupled at the second end to a respective one of the plurality of PC optical waveguides via a respective one of the plurality of vertical coupling gratings; and
a fiber connector comprising a base comprising a connector mating side for mating with a removable connector; a substrate mounting side opposite the connector mating side; and an opening extending between the connector mating side and the substrate mounting side;
wherein the substrate is attached to the substrate mounting side of the fiber connector base; and wherein the first end of the first PLC abuts the substrate mounting side, so that the at least one optical port of the PLC is disposed against the opening for optical coupling to the removable connector.

In one exemplary embodiment, the first PLC comprises a slanted optical surface at the second end of the first PLC. The slanted optical surface may be disposed and oriented so as to couple light reflected by the plurality of vertical coupling gratings into the first plurality of PLC optical waveguides. The photonic chip may include opposed first and second surfaces, wherein the plurality of PC optical waveguides are disposed in or proximate the first surface of the photonic chip. The first PLC may include opposed first and second surfaces, wherein the first plurality of PLC optical waveguides are disposed in or proximate the second surface of the first PLC. The second surface of the first PLC may be affixed to the first surface of the photonic chip.

A second PLC may be affixed to the first surface of the first PLC. The second PLC may include first and second ends, at least one optical port at the first end of the second PLC, and a second plurality of PLC optical waveguides coupled to the at least one optical port of the second PLC and extending to the second end of the second PLC. Each one of the second plurality of the PLC optical waveguides may be optically coupled at the second end of the second PLC to a respective one of the plurality of PC optical waveguides via the plurality of vertical coupling gratings. The slanted optical surface may extend through the second ends of the first and second PLCs, and may be disposed and oriented so as to couple light reflected by the plurality of vertical coupling gratings into the first and second plurality of PLC optical waveguides.

In one embodiment, the photonic chip may include opposed first and second surfaces, wherein the plurality of PC optical waveguides are disposed in or proximate the first surface of the photonic chip;

wherein the first PLC comprises opposed first and second surfaces, wherein the first plurality of PLC optical waveguides are disposed in or proximate the first surface of the first PLC, wherein the second surface of the first PLC is facing the first surface of the photonic chip; and wherein the first PLC further comprises a microlens array extending from the second surface thereof and disposed in an optical path between the slanted optical surface and the vertical coupling gratings for optically coupling each one of the first plurality of PLC optical waveguides to a respective one of the plurality of PC optical waveguides.

In accordance with an aspect of the disclosure, there is provided an optomechanical assembly comprising:

a substrate;

a photonic chip (PC) supported by the substrate, the photonic chip comprising a plurality of PC optical waveguides and a plurality of vertical coupling gratings, wherein each vertical coupling grating is optically coupled to at least one of the plurality of PC optical waveguides;

a first planar lightwave circuit (PLC) over the substrate, the first planar lightwave circuit comprising: first and second ends; first and second optical ports at the first end; and a first plurality of PLC optical waveguides optically coupled to the first and second optical ports and extending to the second end, wherein each one the first plurality of PLC optical waveguides is optically coupled at the second end to a respective one of the plurality of PC optical waveguides via a respective one of the plurality of vertical coupling gratings;

a first optical fiber extending between first and second ends thereof and optically coupled at the first end to the first optical port;

a first fiber connector optically coupled to the second end of the first optical fiber;

a second optical fiber extending between first and second ends thereof and optically coupled at the first end to the second optical port;

a second fiber connector optically coupled to the second end of the second optical fiber; and a housing supporting the substrate, the first fiber connector, and the second fiber connector.

BRIEF DESCRIPTION OF THE DRAWINGS

Exemplary embodiments will now be described in conjunction with the drawings, in which:

FIGS. 3A and 3B illustrate side cross-sectional and partial plan views, respectively, of an optomechanical assembly of the present disclosure, including a pair of vertically stacked PLCs for coupling light between a photonic chip and a connector;

FIGS. 5A and 5B illustrate three-dimensional and plan views, respectively, of a transmitter-receiver optical subassembly (TROSA) of the present disclosure;

FIGS. 7A and 7B illustrate three-dimensional and side views, respectively, of the optomechanical assembly of FIG. 6B;

DETAILED DESCRIPTION

Figure 1A:
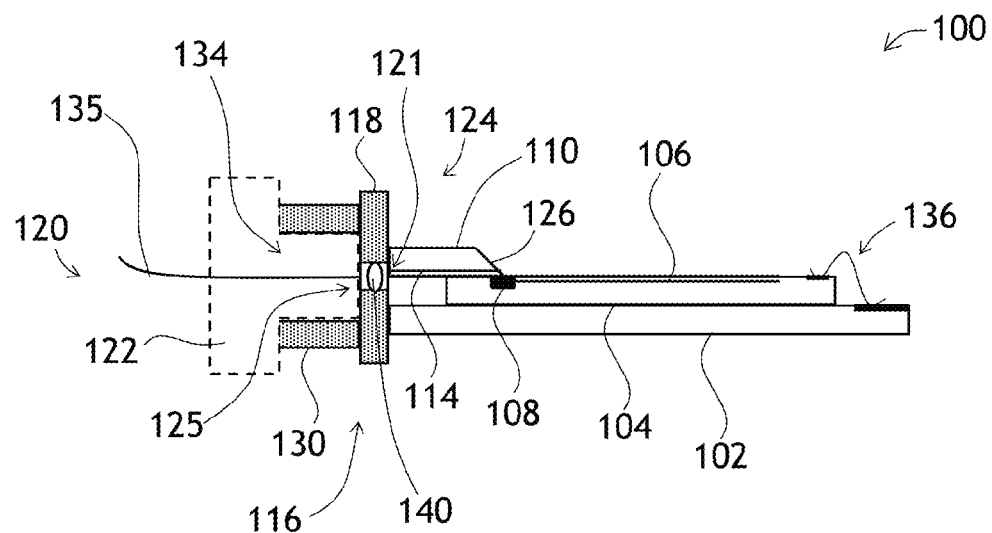
FIG. 1A illustrates a side cross-sectional view of an optomechanical assembly of the present disclosure, including a PLC for coupling light between a photonic chip and a connector.

While the present teachings are described in conjunction with various embodiments and examples, it is not intended that the present teachings be limited to such embodiments. On the contrary, the present teachings encompass various alternatives and equivalents, as will be appreciated by those of skill in the art. In the Figures, similar reference numerals denote similar elements.

Figure 1B:
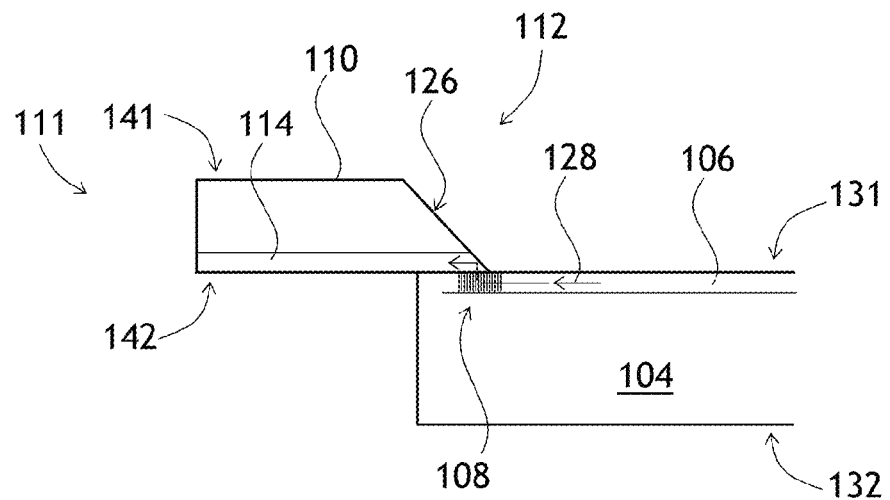
FIG. 1B illustrates a zoomed-in view of the optomechanical assembly of FIG. 1A.
Figure 1C:
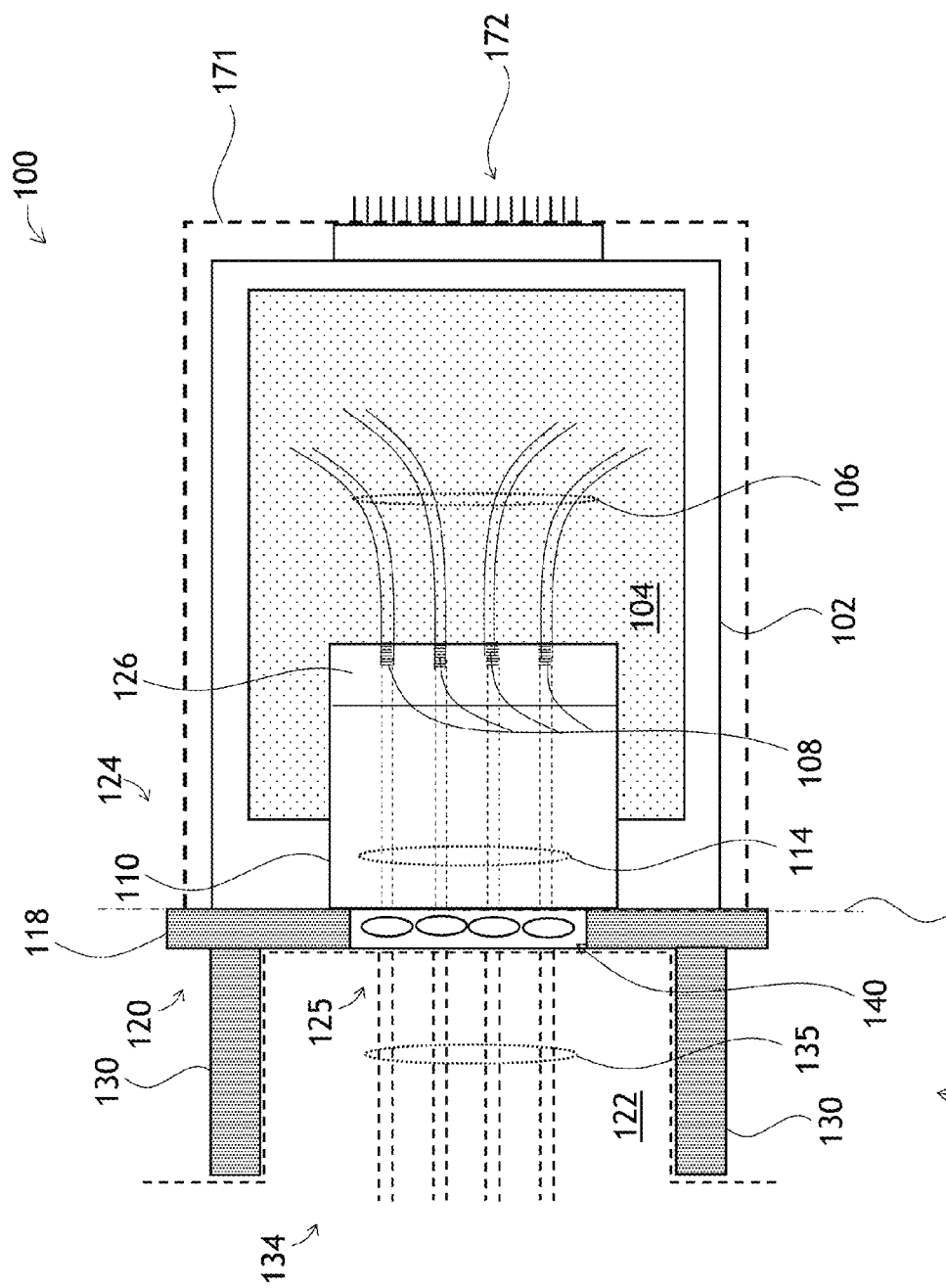
FIG. 1C illustrates a plan view of the optomechanical assembly of FIG. 1A.

Referring to FIGS. 1A, 1B, and 1C, an optomechanical assembly 100 may include a substrate 102 and a photonic chip (PC) 104 supported by the substrate 102. The photonic chip 104 may include a plurality of PC optical waveguides 106 and a plurality of vertical coupling gratings 108 optically coupled to the plurality of PC optical waveguides 106. The PC optical waveguides 106 may be optically coupled to the plurality of vertical coupling gratings 108 one-to-one, or, for example, two-to-one for polarization-splitting vertical coupling gratings 108. The photonic chip 104 may include an electro-optical chip, such as, for example, a laser diode chip, a transmitter chip, etc.; an optoelectronic chip such as, for example, a photodiode chip, a receiver chip; or a purely passive chip, such as, for example, an optical filter or demultiplexor chip; and so on. In other words, the term "photonic chip" is used herein as a broad term for denoting an integrated photonic chip, which may be configured to perform a variety of optical, electro-optical, and/or optoelectronic functions.

A first PLC 110 may be disposed over the substrate 102. The first PLC 110 extends between first 111 and second 112 ends (FIG. 1B) of the first PLC 110. The first PLC 110 may include at least one optical port 121 at the first end 111 and a first plurality of PLC optical waveguides 114 coupled to the at least one optical port 121 and extending to the second end 112. The first plurality of PLC optical waveguides 114 may be optically coupled at the second end 112 to the plurality of PC optical waveguides 106 via the plurality of vertical coupling gratings 108.

A fiber connector 116 may be provided (FIGS. 1A and 1C). The fiber connector 116 may include a base 118 comprising a connector mating side 120 for mating with a removable connector 122, a substrate mounting side 124 opposite the connector mating side 120, and an opening 125 extending between the connector mating 120 side and the substrate mounting side 124. The substrate 102 may be affixed to the substrate mounting side 124 of the fiber connector base 118. The first end 111 of the first PLC 110 may abut the substrate mounting side 124, so that the at least one optical port 121 of the first PLC 110 is disposed against the opening 125 for optical coupling to the removable connector 122. Herein, "at least one optical port" may include a common optical port 121 for the first plurality of PLC optical waveguides 114, an individual optical port 121 for each one of the first plurality of PLC optical waveguides 114, or another number of optical ports. By way of a non-limiting example, four PLC optical waveguides 114 may be optically coupled, one-to-one, to an array of four microlenses 140, which may be optically coupled, one-to-one, to optical fibers 135 of the removable connector 122. The PLC optical waveguides 114 may also be butt-coupled to the removable connector 122. The opening 125 may be elongated to accommodate the array of microlenses 140 (FIG. 1C). In this example, the "optical ports" denote tips of the PLC optical waveguides 114, which are disposed on a straight line 138.

Still referring to FIGS. 1A-1C, the first PLC 110 may include a slanted optical surface 126 at its second end 112. The slanted optical surface 126 may be disposed and oriented so as to couple light 128 (FIG. 1B) reflected by the plurality of vertical coupling gratings 108 into the first plurality of PLC optical waveguides 114. The slanted optical surface 126 may be produced, for example, by angle-polishing the second end 112 of the first PLC 110. The slanted optical surface 126 may be coated with a reflector surface, although the coating is often not required, because the light 128 may reflect from the slanted optical surface 126 by total internal reflection (TIR).

Referring specifically to FIG. 1B, the photonic chip 104 may include opposed first (e.g. upper) 131 and second (e.g. lower) 132 surfaces. The plurality of PC optical waveguides 106 may be disposed in or proximate the first surface 131 of the photonic chip 104. For instance, the plurality of PC optical waveguides 106 may be buried under the first surface 131, or the plurality of PC optical waveguides 106 may include ridge-type waveguides extending upwards from the first surface 131. The first PLC 110 may include opposed first (e.g. upper) 141 and second (e.g. lower) 142 surfaces, and the first plurality of PLC optical waveguides 114 may be disposed in or proximate the second surface 142 of the first PLC 110. For instance, the first plurality of PLC optical waveguides 114 may be buried under the second surface 141, or the plurality of PC optical waveguides 114 may include ridge-type waveguides extending downwards from the second surface 142. The second surface 142 of the first PLC 110 may be affixed, e.g. epoxied, to the first surface 131 of the photonic chip 104.

As an example, the first PLC 110 may be made of silicon, with silica waveguides 114. The photonic chip 104 may also be silicon-based and may include, for example, an optical transmitter, an optical receiver, an optical transceiver, etc. As another example, the photonic chip 104 may be based on indium phosphide, and may include an optical modulator, an optical receiver, etc.

Referring specifically to FIGS. 1A and 1C, the fiber connector 116 may further include a peripheral wall 130 extending from the connector mating side 120 of the base 118 and defining a receptacle 134 for receiving and registering the removable connector 122 in the receptacle 134. Inverted configurations, where the removable connector 122 is female and the connector 116 is male, are also possible. The photonic chip 104 may be electrically coupled to the substrate 102 via a plurality of electrical connections 136 (FIG. 1A), such as wirebonds, for example.

The substrate 102 may perform some electronic function, such as signal conversion, interfacing, etc. The substrate 102 may include a printed circuit board (PCB), a printed circuit board assembly (PCBA), a ceramic or a silicon chip with additional electronic functionalities, and the like. An enclosure 171 may be provided. An electrical connector 172 may be provided in the enclosure 171, for interfacing the substrate 102 with outside electronic circuitry, not shown.

Figure 2A:
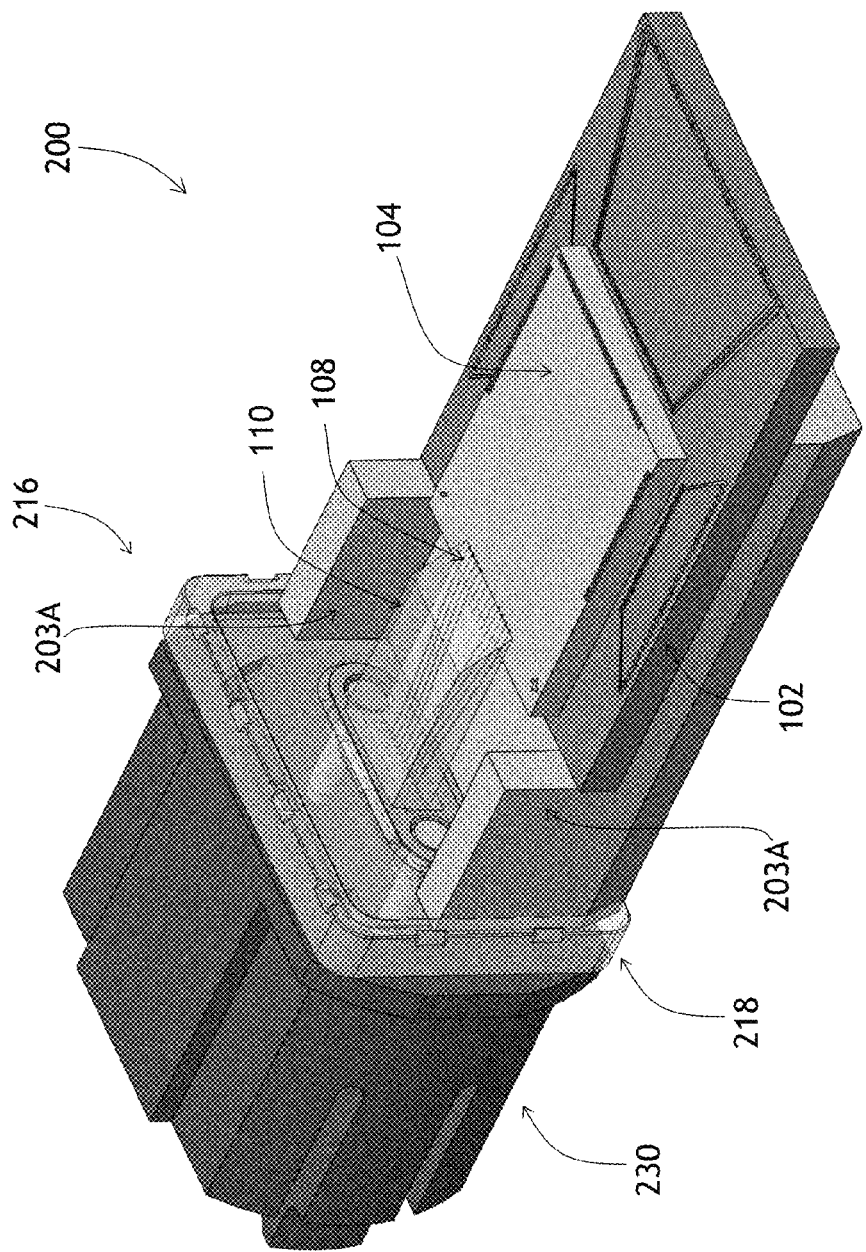
FIGS. 2A and 2B illustrate three-dimensional views of one embodiment of the optomechanical assembly of FIGS. 1A-1C.
Figure 2B:
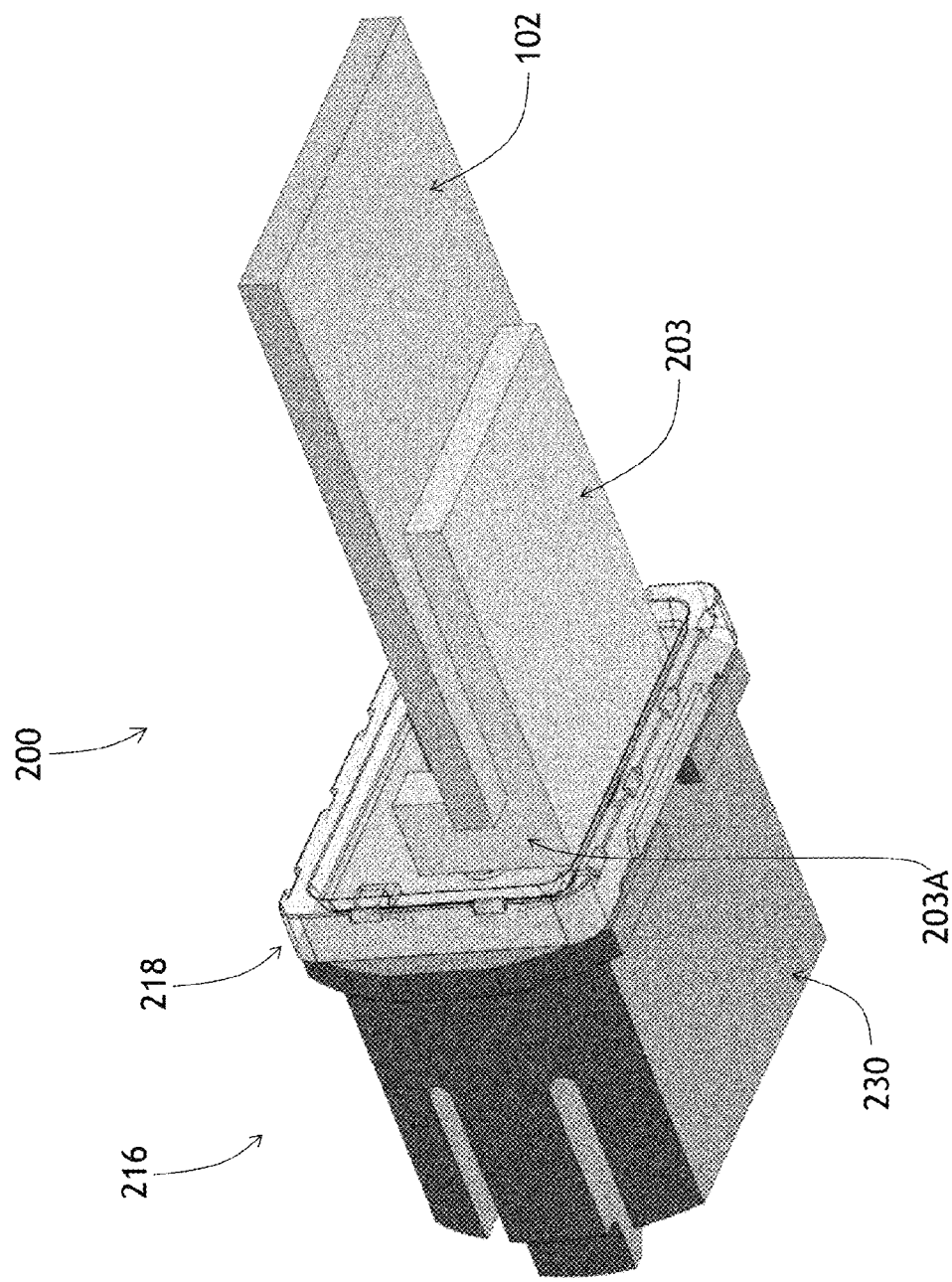
Figure 2C:
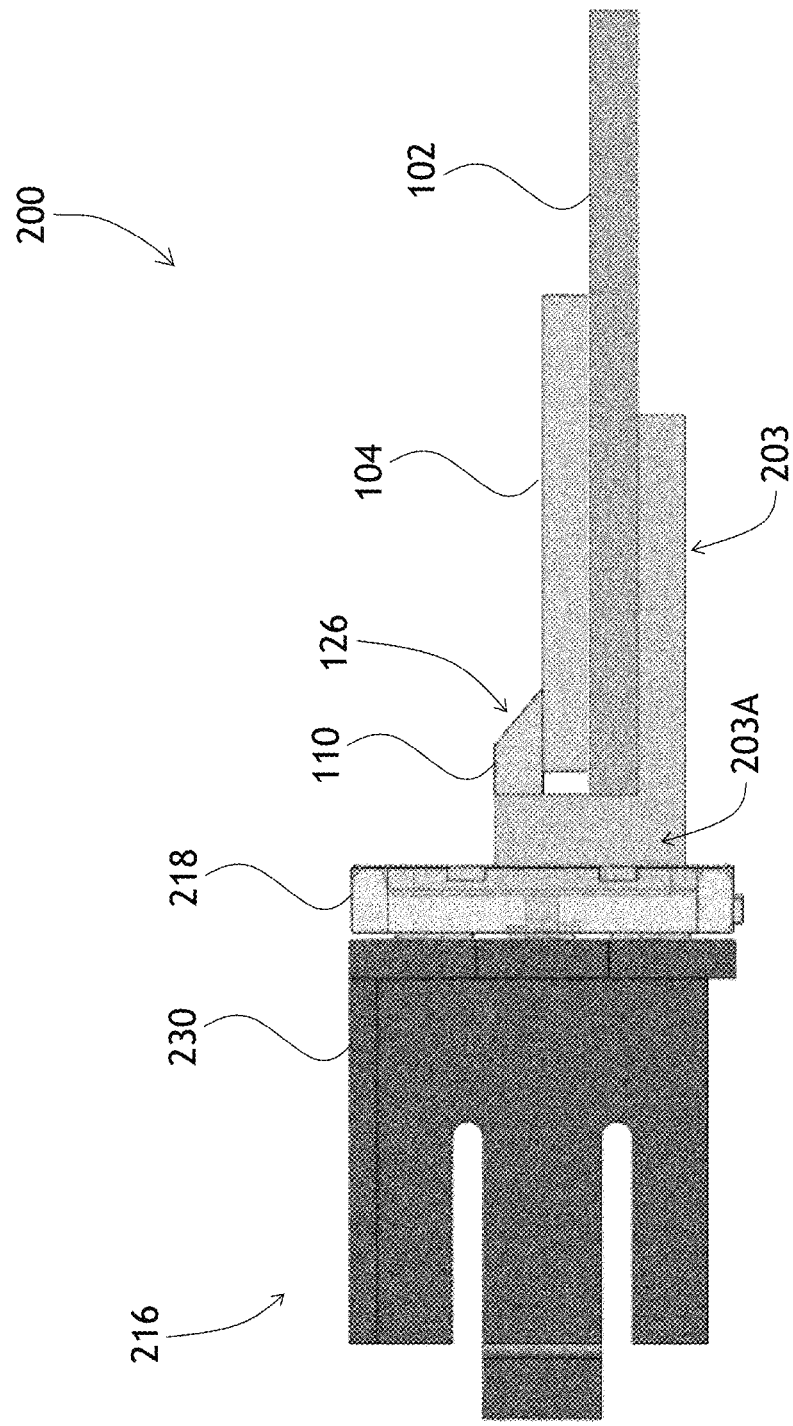
FIG. 2C illustrates a side view of the optomechanical assembly embodiment of FIGS. 2A and 2B.

Various embodiments and examples of the optomechanical assembly 100 will now be considered. Referring to FIGS. 2A, 2B, and 2C with further reference to FIGS. 1A-1C, an optomechanical assembly 200 is a variant of the optomechanical assembly 100 of FIGS. 1A-1C. The optomechanical assembly 200 of FIGS. 2A-2C may include a Parallel Single Mode 4 (PSM4) multi-fiber push-on (MPO) connector 216 including a base 218 and a peripheral wall 230 extending from the base 218. A supporting plate 203 may be provided for attaching the substrate 102 to the base 218. The substrate 102 may be mounted on the supporting plate 203, which may include flanges 203A extending towards the base 218.

Referring now to FIGS. 3A and 3B with further reference to FIGS. 1A-1C, an optomechanical assembly 300 is a variant of the optomechanical assembly 100 of FIGS. 1A-1C. The optomechanical assembly 300 of FIGS. 3A and 3B may include a second PLC 310 affixed to the first surface 141 of the first PLC 110. Similarly to the first PLC 110, the second PLC 310 may include first 311 and second 312 ends; at least one optical port 321 at the first end 311; and a second plurality of PLC optical waveguides 314 coupled to the at least one optical port 321 and extending to the second end 312 of the second PLC 310. The plurality of vertical coupling gratings 108 may include first 308A and second 308B arrays of vertical coupling gratings, offset relative to each other, e.g. forming a zigzag pattern, as shown in FIG. 3B. The offset is optional, and the waveguides 314 of the second plurality may be disposed directly above the waveguides 114 of the first plurality. The first array of vertical coupling gratings 308A may be optically coupled to the first plurality of PLC waveguides 114, and the second array of vertical coupling gratings 308B may be optically coupled to the second plurality of PLC waveguides 314. The second plurality of the PLC optical waveguides 314 may be optically coupled at the second end 312 of the second PLC 310 to the plurality of PC optical waveguides 106 via the second array of vertical coupling gratings 308B. The first or second plurality of PLC waveguides 114 and 314, respectively, may include a slight bend or curve therein, whereby near the first end 311, the ends of the second plurality of PLC waveguides 314 may be disposed over the ends of the first plurality of PLC waveguides 114, as shown in FIG. 3B.

A slanted optical surface 326 may extend along the second ends 112 and 312 of the first 110 and second 310 PLCs, respectively. The slanted optical surface 326 may be disposed and oriented so as to couple a light portion 328A reflected by the first array of vertical coupling gratings 308A into the first plurality of PLC optical waveguides 114, and to couple a light portion 328B reflected by the second array of vertical coupling gratings 308B into the second plurality of PLC optical waveguides 314. An optional two-dimensional array of microlenses 340 may be provided for coupling to optical fibers of an external multi-fiber connector, not shown. Alternatively, the external optical fibers may be butt-coupled, one-to-one, to the first 114 and second 314 pluralities of PLC optical waveguides.

Figure 4:
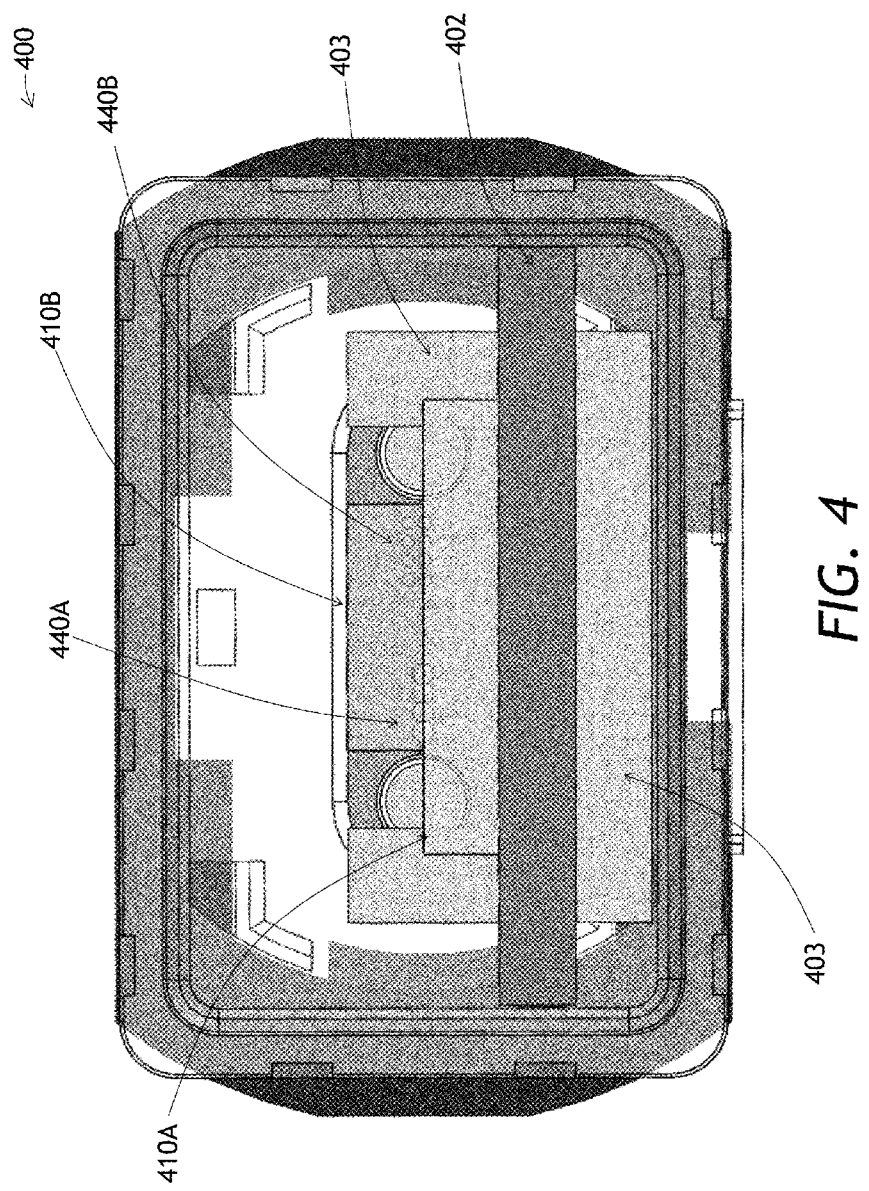
FIG. 4 illustrates a frontal cross-sectional view of an optomechanical assembly of the present disclosure.

Turning to FIG. 4 with further reference to FIG. 1C and FIG. 3, an optomechanical assembly 400 may combine a single-PLC structure 410A and a double-PLC structure 410B over a common substrate 402 attached to a supporting plate 403. On the frontal view of FIG. 4, a single-row microlens array 440A corresponds to the single-row microlens array 140 of FIG. 1C, and a double-row microlens array 440B corresponds to the double-row microlens array 340 of FIG. 3. The microlens arrays 440A and 440B are optional, and the first 114 and second 314 pluralities of PLC optical waveguides may simply extend through the opening 125 (FIG. 1C).

Figure 5B:
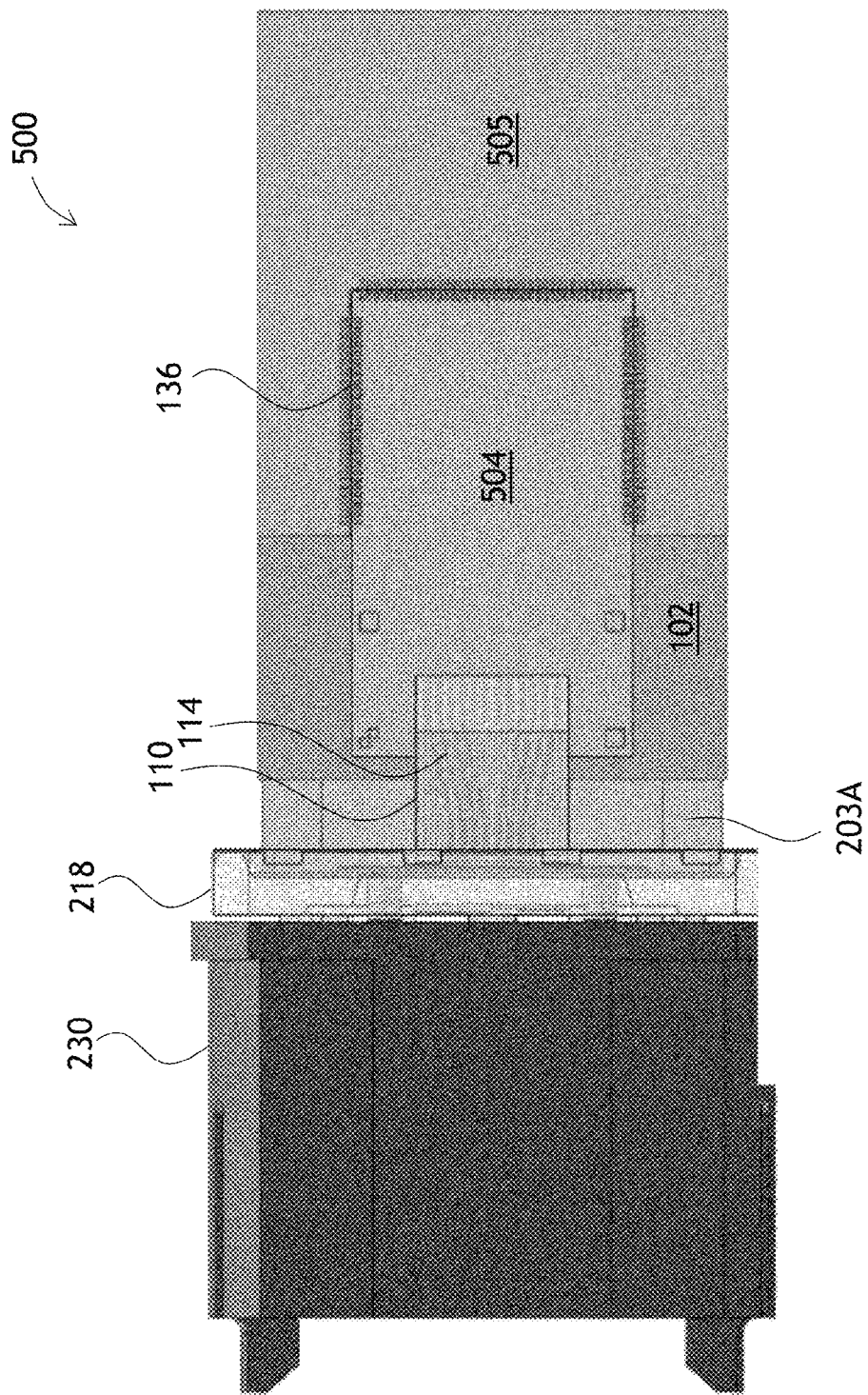

Referring now to FIGS. 5A and 5B with further reference to FIGS. 1A-1C and 2A-2C, a transmitter-receiver optical subassembly (TROSA) 500 may include similar elements as the optomechanical subassembly 100 (FIGS. 1A-1C) and 200 (FIGS. 2A-2C). The TROSA 500 may include, for example, the substrate 102 on the supporting plate 203, a TROSA photonic chip 504 on the substrate 102, a TROSA electronic chip 505 on the substrate 102, the PLC 110 optically coupled via the plurality of vertical coupling gratings 108 to the TROSA photonic chip 504, the base 218 and the peripheral wall 230 of the fiber connector 216. The TROSA photonic chip 504 may be electrically coupled to the TROSA electronic chip 505 by the wirebonds 136. The TROSA photonic chip 504 may perform functions of transmitting and receiving light, and the TROSA electronic chip 505 may perform functions of an electrical interface supplying and receiving corresponding streams of digital data in electrical domain. Furthermore, the TROSA electronic chip 505 may also include a micro-controller, a voltage regulator, RF terminations, and the like. The TROSA photonic chip 504 is one example of the photonic chip 104 of the optomechanical assembly 100 of FIGS. 1A-1C and the optomechanical assembly 200 of FIGS. 2A-2C; more generally, the photonic chip 104 may perform any suitable optical, optoelectronic, and/or electro-optical function. By way of the non-limiting example, the photonic chip 104 may include an optical transmitter, an optical receiver, or both; an optical modulator; an optical filter, including a tunable optical filter; and so on.

Figure 6A:
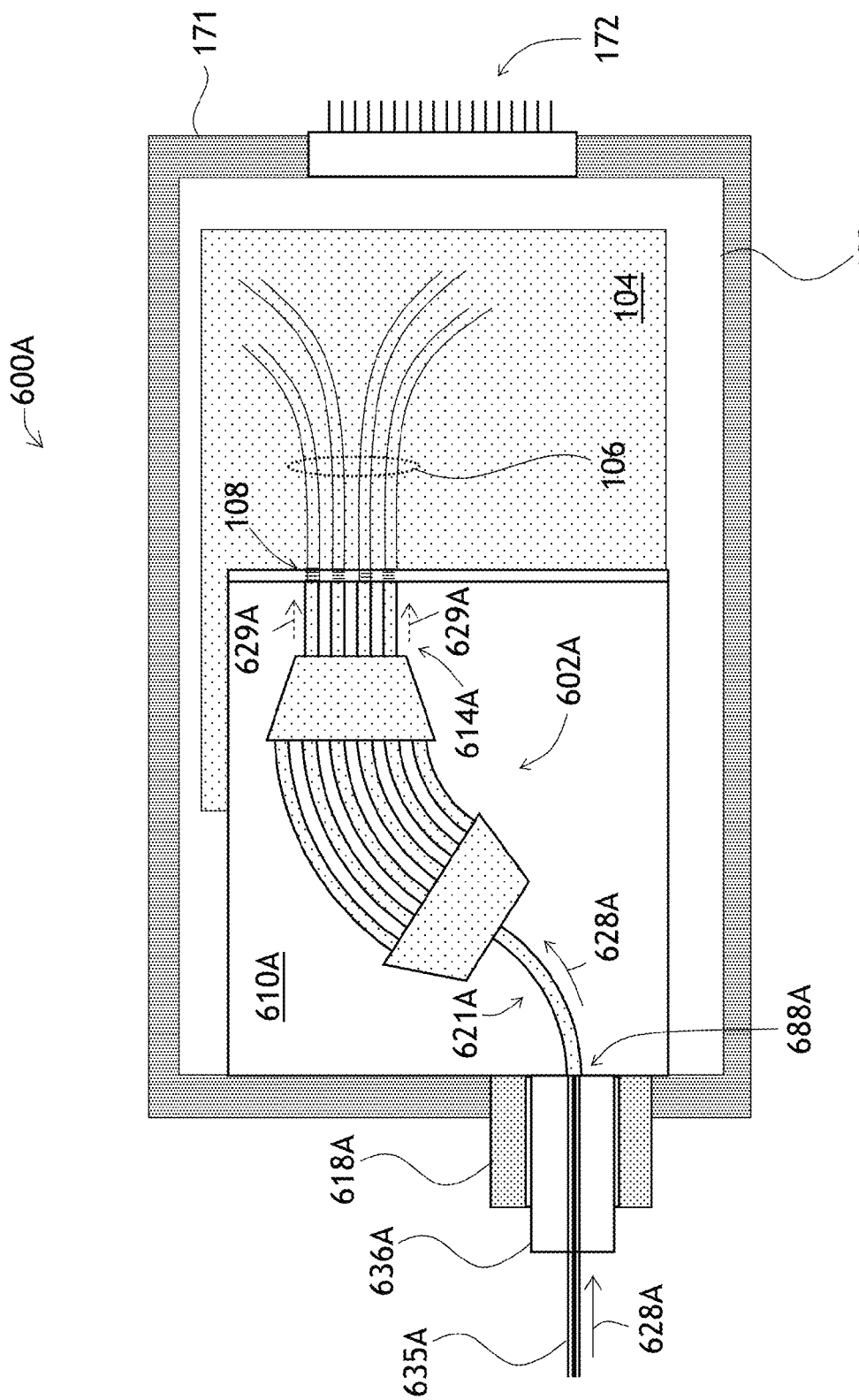
FIG. 6A illustrates a plan schematic view of an optomechanical assembly embodiment including an arrayed waveguide (AWG) demultiplexor PLC.

Turning to FIG. 6A with further reference to FIGS. 1A-1C, an optomechanical assembly 600A is an embodiment of the optomechanical assembly 100 of FIGS. 1A-1C. The optomechanical assembly 600A of FIG. 6A may include a PLC 610A having an arrayed waveguide (AWG) demultiplexor 602A. The AWG demultiplexor 602A may include an input waveguide 621A and a plurality of output waveguides 614A, which may correspond to the first plurality of PLC optical waveguides 114 of the PLC 110 of the optomechanical assembly 100 of FIGS. 1A-1C.

In the embodiment shown in FIG. 6A, the input waveguide 621A of the AWG demultiplexor 602A is coupled at a first optical port 688A to an input optical fiber 635A in a ferrule 636A. The ferrule 636A may be held in a mating sleeve 618A, which may be mechanically coupled to the enclosure 171 and optically coupled to the PLC 610A. The PLC 610A may be affixed to the photonic chip 104, which may be supported by the substrate 102.

In operation, a wavelength-multiplexed optical signal 628A propagating in the optical fiber 635A may be coupled to the first optical port 688A of the input waveguide 621A of the AWG demultiplexor 602A. The AWG demultiplexor 602A may separate the multiplexed optical signal 628A into individual wavelength channels 629A, which may be coupled, via the individual output waveguides 614A and the individual vertical coupling gratings 108, into respective waveguides 106 of the photonic chip 104, where the wavelength channels 629A may be detected by photodetectors, not shown, of the photonic chip 104.

Figure 6B:
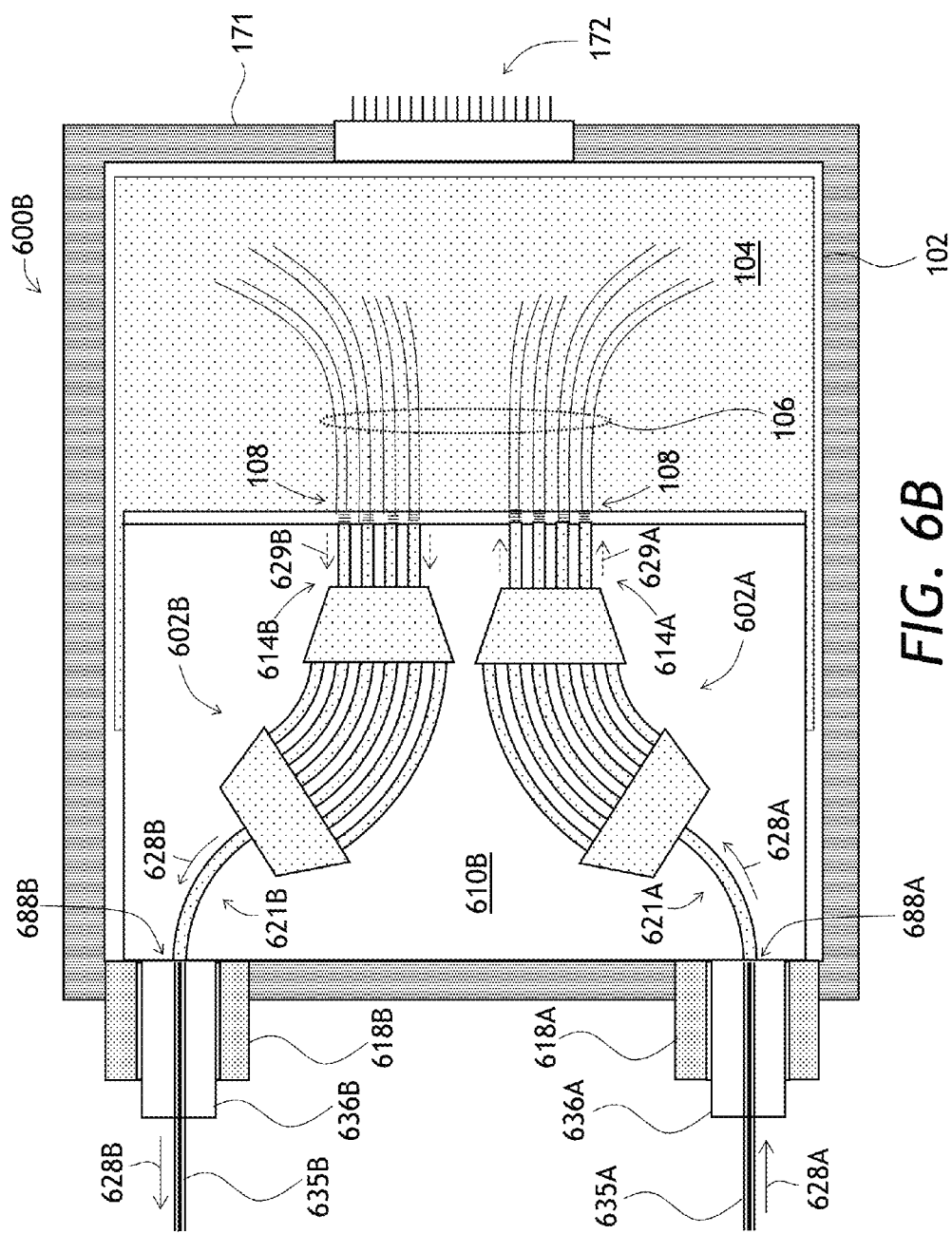
FIG. 6B illustrates a plan schematic view of an optomechanical assembly embodiment including an AWG multiplexor/demultiplexor PLC.

Referring now to FIG. 6B with further reference to FIG. 6A, an optomechanical assembly 600B of FIG. 6B is an extended embodiment of the optomechanical assembly 600A of FIG. 6A. The optomechanical assembly 600B of FIG. 6B may further include a PLC 610B, which may include both the arrayed waveguide demultiplexor 602A and an additional arrayed waveguide multiplexor 602B. The additional arrayed waveguide multiplexor 602B may include a plurality of input waveguides 614B, which may correspond to a subset of the first plurality of PLC optical waveguides 114 of the PLC 110 of the optomechanical assembly 100 of FIGS. 1A-1C, and an output waveguide 621B having a second optical port 688B.

In the embodiment shown in FIG. 6B, the output waveguide 621B of the AWG multiplexor 602B is coupled at the second optical port 688B to an optical fiber 635B in a ferrule 636B. The ferrule 636B may be held in a mating sleeve 618B, which may be mechanically coupled to enclosure 171 and optically coupled to the PLC 610B. The PLC 610B may be affixed to the photonic chip 104, which may be supported by the substrate 102. Thus, the input waveguide 621A and the output waveguide 621B are optically coupled to the respective fibers 635A and 635B via the respective first 688A and second 688B optical ports.

In operation, wavelength channels 629B may be generated by individual transmitters, not shown, of the photonic chip 104. The wavelength channels 629B may propagate in individual input waveguides 614B. The multiplexor 602B may combine the wavelength channels 629B into a multiplexed optical signal 628B, which may propagate from the output waveguide 621B to the output optical fiber 635B. The optomechanical assembly 600B may function as a multi-wavelength optical transceiver, receiving and transmitting wavelength-multiplexed optical signals.

Figure 6C:
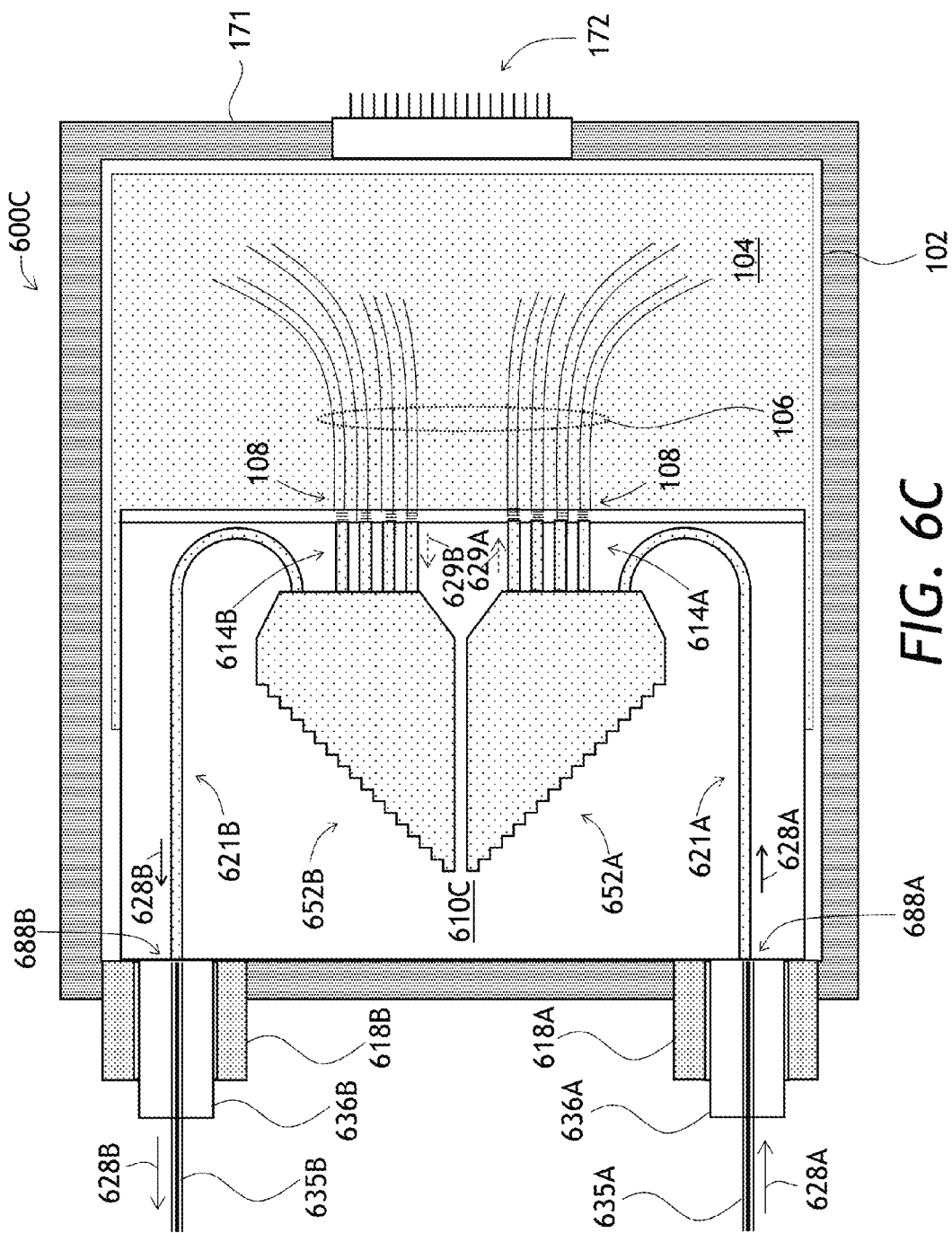
FIG. 6C illustrates a plan schematic view of an optomechanical assembly embodiment including an Echelle grating multiplexor/demultiplexor PLC.

Referring to FIG. 6C with further reference to FIG. 6B, an optomechanical assembly 600C of FIG. 6C is an alternative embodiment of the optomechanical assembly 600B of FIG. 6B. The optomechanical assembly 600C of FIG. 6C may include a PLC 610C having an Echelle grating demultiplexor 652A instead of the AWG demultiplexor 602A (FIG. 6B), and an Echelle grating multiplexor 652B (FIG. 6C) instead of the AWG multiplexor 602B (FIG. 6B).

In operation, the wavelength-multiplexed optical signal 628A propagating in the optical fiber 635A may be coupled via the first optical port 688A to the input waveguide 621A of the Echelle grating demultiplexor 652A. The Echelle grating demultiplexor 652A may separate the multiplexed optical signal 628A into the individual wavelength channels 629A, which may be coupled, via the individual output waveguides 614A and the individual vertical coupling gratings 108, into respective waveguides 106 of the photonic chip 104, where the wavelength channels 629A may be detected by photodetectors, not shown, of the photonic chip 104. The wavelength channels 629B generated by the individual transmitters of the photonic chip 104 may propagate in the individual input waveguides 614B. The Echelle grating multiplexor 652B may combine the wavelength channels 629B into the multiplexed optical signal 628B, which may propagate from the output waveguide 621B to the output optical fiber 635B via the second optical port 688B. The optomechanical assembly 600C may function as a multi-wavelength optical transceiver, receiving and transmitting wavelength-multiplexed optical signals.

Figure 6D:
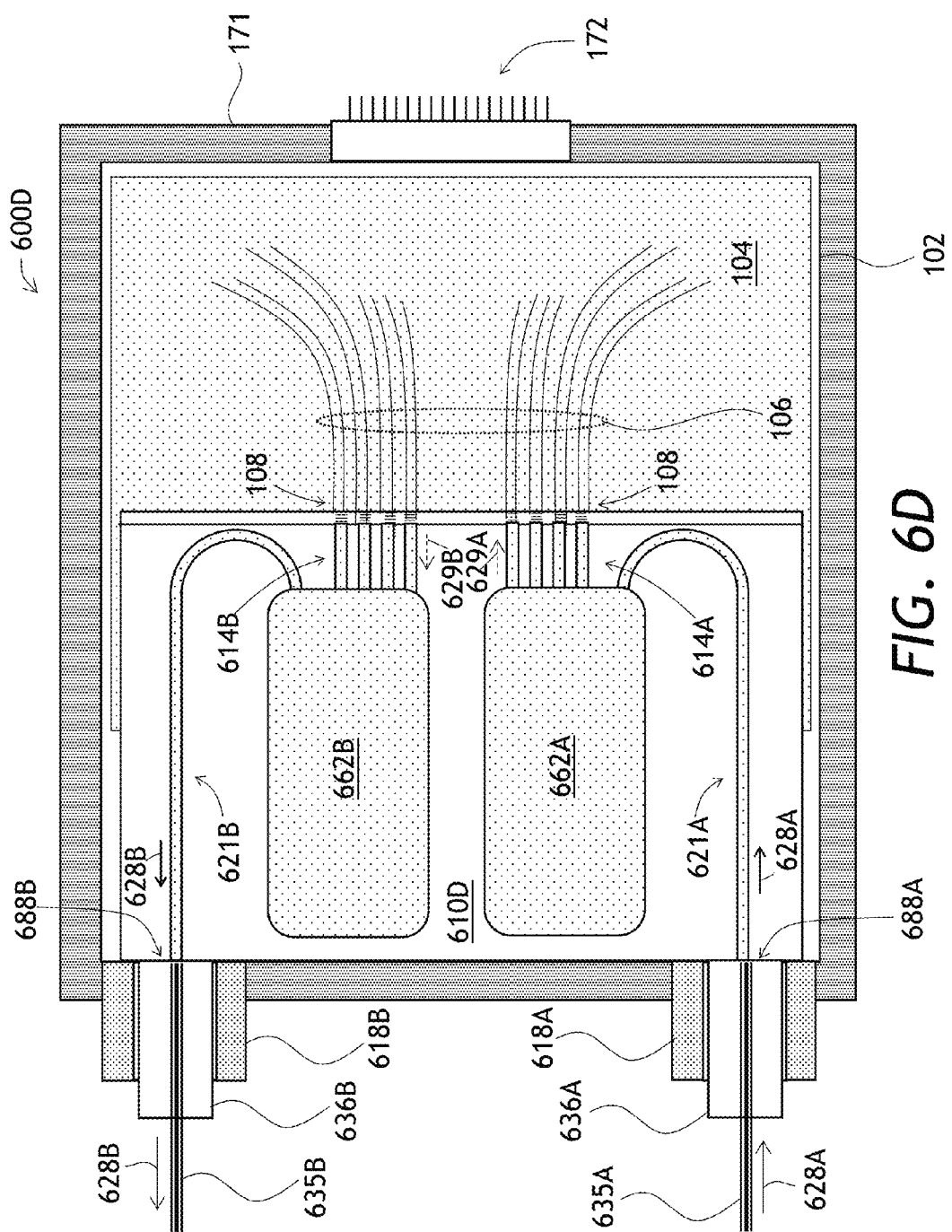
FIG. 6D illustrates a plan schematic view of an optomechanical assembly embodiment including a cascaded Mach-Zehnder interferometer multiplexor/demultiplexor PLC.

Referring to FIG. 6D with further reference to FIG. 6B, an optomechanical assembly 600D of FIG. 6D is another alternative embodiment of the optomechanical assembly 600B of FIG. 6B. The optomechanical assembly 600D of FIG. 6D may include a PLC 610D having a cascaded Mach-Zehnder interferometer demultiplexor 662A instead of the AWG demultiplexor 602A (FIG. 6B), and a cascaded Mach-Zehnder interferometer multiplexor 662B (FIG. 6D) instead of the AWG multiplexor 602B (FIG. 6B), with similar operation as the optomechanical assembly 600B of FIG. 6B and the optomechanical assembly 600C of FIG. 6C.

Figure 6E:
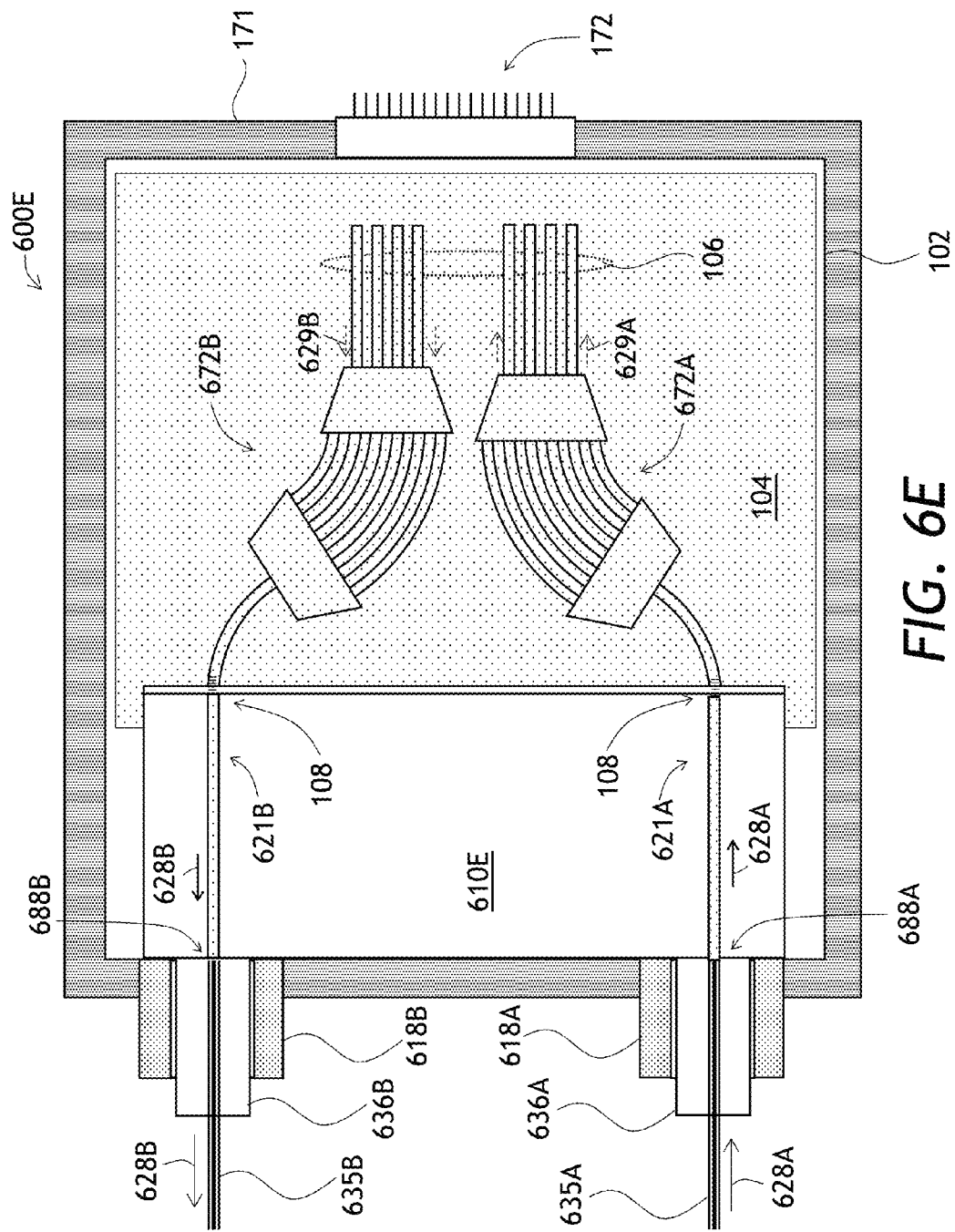
FIG. 6E illustrates a plan schematic view of an optomechanical assembly embodiment including an AWG multiplexor/demultiplexor PC.

Turning now to FIG. 6E with further reference to FIG. 6B, an optomechanical assembly 600E of FIG. 6E is yet another alternative embodiment of the optomechanical assembly 600B of FIG. 6B. A PLC 610E of the optomechanical assembly 600E of FIG. 6E may include the input 621A and output 621B waveguides, without any multiplexors or demultiplexors. Instead, an AWG demultiplexor 672A and an AWG multiplexor 672B are disposed on the photonic chip 104. The AWG demultiplexor 672A and an AWG multiplexor 672B may perform similar functions as the AWG demultiplexor 602A and AWG multiplexor 602B of the optomechanical assembly 600B of FIG. 6B.

Figure 7A:
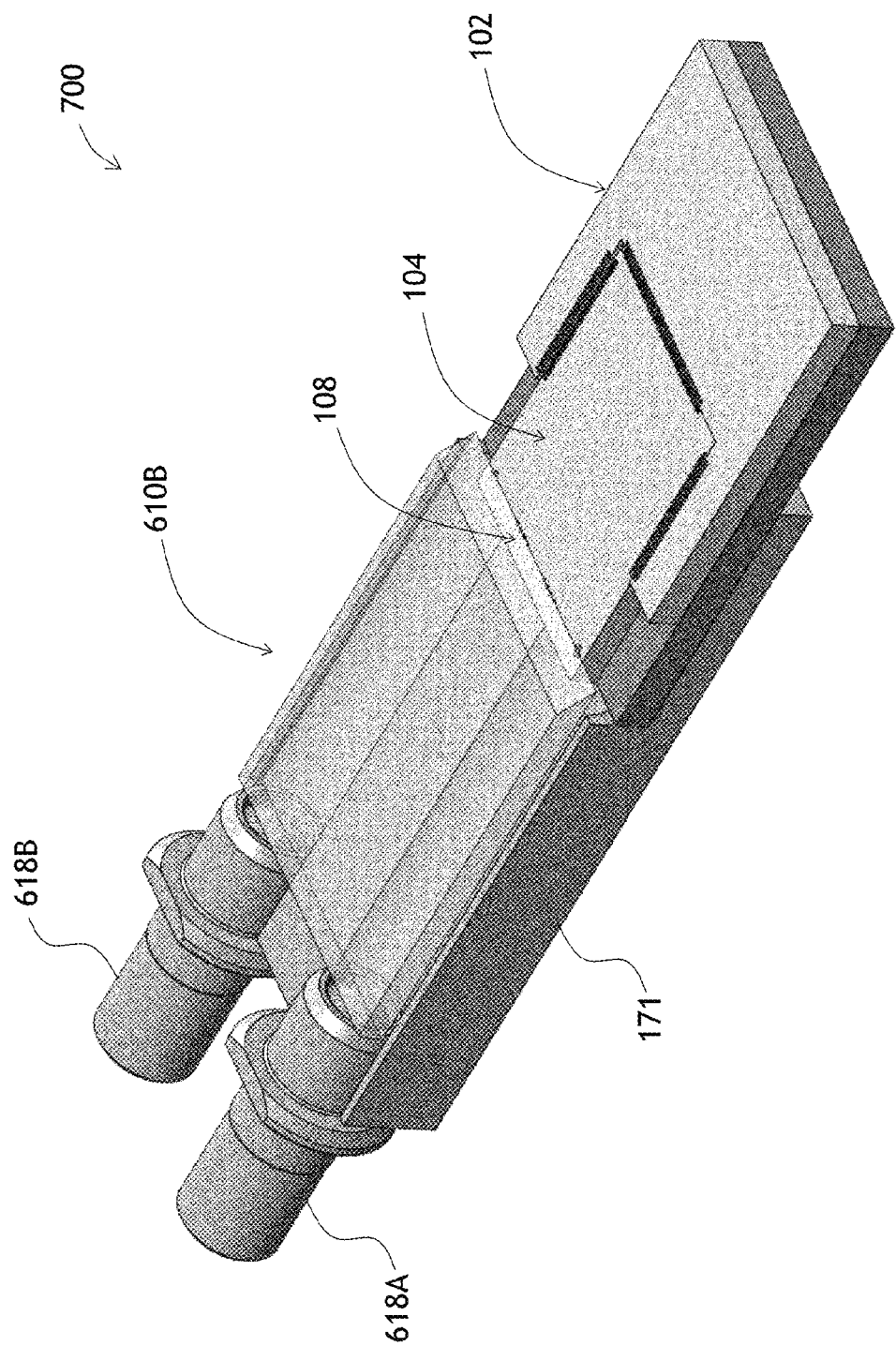

Referring to FIGS. 7A and 7B with further reference to FIGS. 6A and 6B, an optomechanical assembly 700 is an exemplary implementation of the optomechanical assemblies 600B of FIG. 6B; 600C of FIG. 6C; 600D of FIG. 6D; and 600E of FIG. 6E. The optomechanical assembly 700 of FIGS. 7A and 7B may include the first mating sleeve 618A for receiving the first ferrule 636A supporting the first fiber 635A, and the second mating sleeve 618B for receiving the second ferrule 636B supporting the second fiber 635B. Only a portion of the enclosure 171 is shown.

Figure 7C:
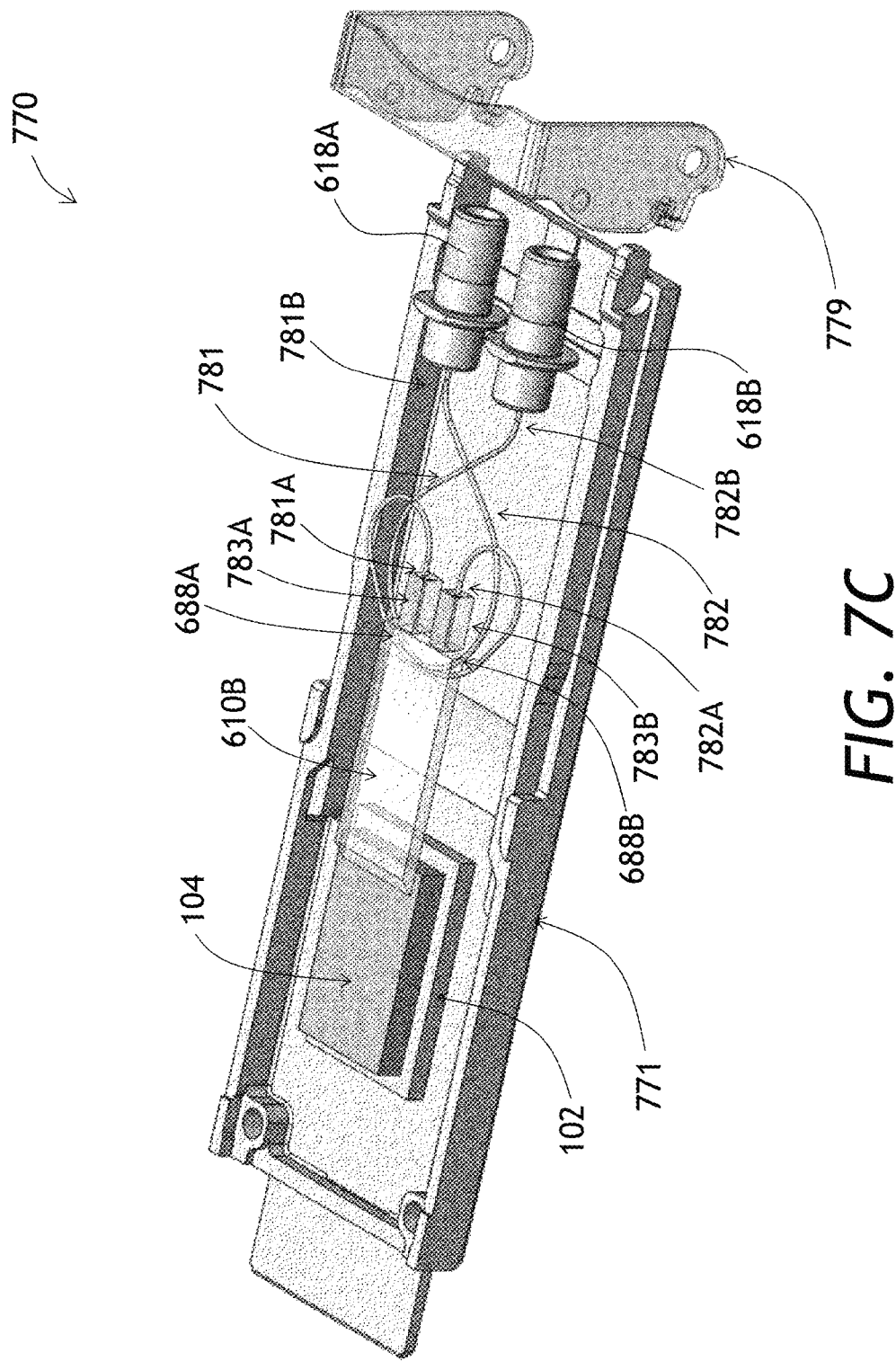
FIG. 7C illustrates a three-dimensional view of an alternative embodiment of the optomechanical assembly of FIG. 6B packaged in a small form pluggable (SFP) package.
Figure 7D:
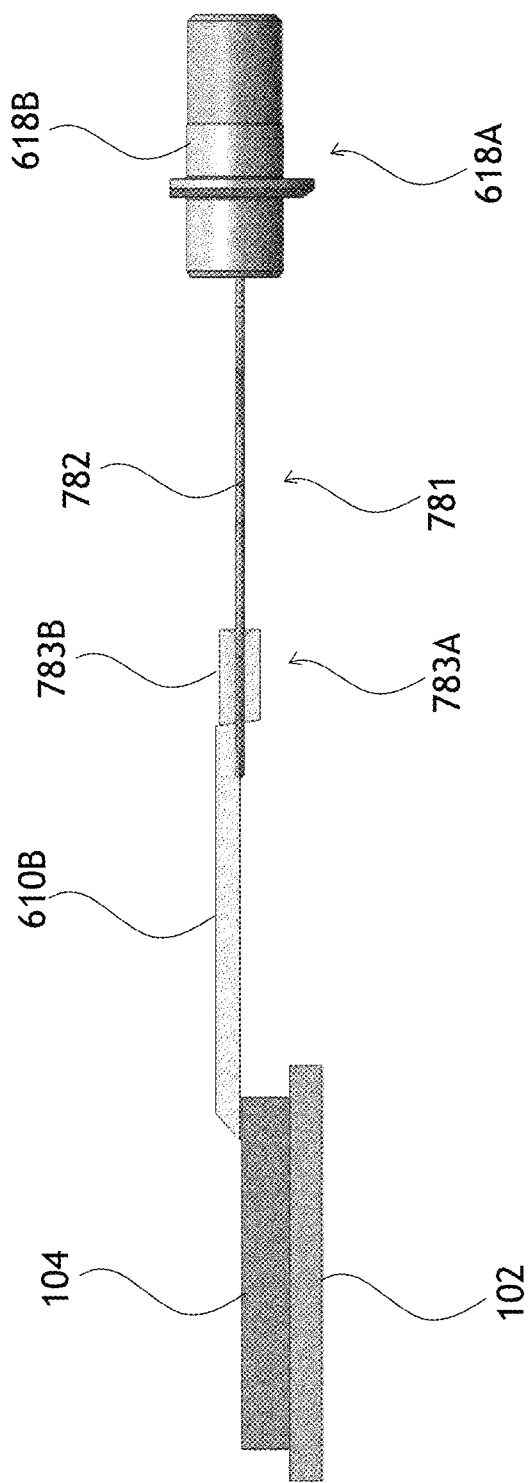
FIG. 7D illustrates a side view of the embodiment of FIG. 7C (SFP package omitted)

Referring to FIGS. 7C and 7D with further reference to FIG. 6B, an optomechanical assembly 770 is an alternative embodiment of the optomechanical assembly 600B of FIG. 6B. The optomechanical assembly 770 (FIG. 7C) may include the substrate 102, the photonic chip 104 supported by the substrate 102, and the PLC 610B over the substrate 102. A first optical fiber 781 extending between first 781A and second 781B ends may be optically coupled at the first end 781A to the first optical port 688A. The first mating sleeve 618A may be optically coupled to the second end 781B of the first optical fiber 781. A second optical fiber 782 extending between first 782A and second 782B ends may be optically coupled at the first end 782A to the second optical port 688B. The second mating sleeve 618B may be optically coupled to the second end 782B of the second optical fiber 782. The substrate 102, the first mating sleeve 618A, and the second mating sleeve 618B may be supported by a housing 771. In the embodiment shown, the housing 771 is a Small Form Pluggable (SFP) housing including a clip 779 for affixing a dual LC type connector, not shown. Other types of housings may be used. The first 781 and second 782 optical fibers may be held in ferrules 783A and 783B, which may be side-coupled to the PLC 610B as shown in FIG. 7D. Preferably, the first 781 and second 782 optical fibers are flexible enough to be bent or coiled at a bend radius of less than 8 mm.

As explained above, the PLC 610B includes the AWG demultiplexor 602A, and the AWG multiplexor 602B. Other types of PLCs may be used in place of the PLC 610B, for example the PLC 610C including Echelle grating demultiplexor 652A and multiplexor 652B (FIG. 6C), the PLC 610D including cascaded Mach-Zehnder interferometer demultiplexor 662A and multiplexor 662B (FIG. 6D), and other types of PLCs.

Figure 8A:
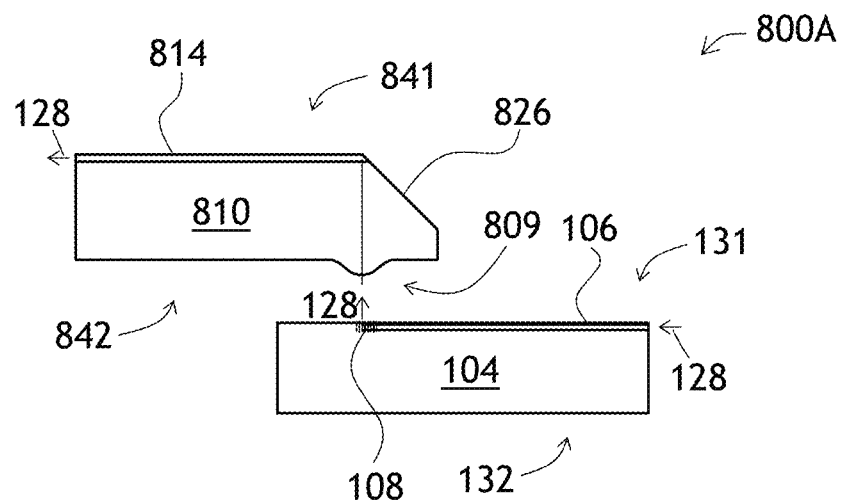
FIG. 8A illustrates a side cross-sectional view of a PLC optically coupled to a photonic chip by an array of microlenses.

Turning to FIG. 8A with further reference to FIGS. 1A-1C, an optomechanical assembly 800A is an embodiment of the optomechanical assembly 100 of FIGS. 1A-1C. The photonic chip 104 of the optomechanical assembly 800A of FIG. 8A may include the opposed first 131 and second 132 surfaces. The plurality of PC optical waveguides 106 may be disposed in or proximate the first surface 131 of the photonic chip 104. A PLC 810 may include opposed first (e.g. upper) 841 and second (e.g. lower) 842 surfaces. A plurality of PLC optical waveguides 814 may be disposed in or proximate the first surface 841 of the PLC 810. The second surface 842 of the PLC 810 may be facing the first surface 131 of the photonic chip 104. Similarly to the first PLC 110 of the optomechanical assembly 100 of FIGS. 1A-1C, the PLC 810 of FIG. 8 may include a slanted optical surface 826 disposed and oriented so as to reflect and couple the light 128 reflected by the plurality of vertical coupling gratings 108 into the plurality of PLC optical waveguides 814. By way of a non-limiting example, the light 128 may form an angle of approximately 8° with respect to the first surface 131 of the photonic chip 104, and the slanted optical surface 826 may be oriented at the angle of approximately 41° with respect to the first surface 131 of the photonic chip 104.

The PLC 810 may further include a microlens array 809 integrated therein (e.g. monolithic) and extending from the second surface 842 and disposed in an optical path between the slanted optical surface 826 and the vertical coupling gratings 108 for optically coupling each one of the plurality of PLC optical waveguides 814 to a respective one of the plurality of PC optical waveguides 106. The microlens array 809 may be formed by any suitable method, for example, by etching the PLC 810. The microlens array 809 may also be formed on a separate wafer, which may be bonded to a wafer diced into bars including the PLC 810, and then the resulting assembly (not shown) may be diced and polished as a unit.

Figure 8B:
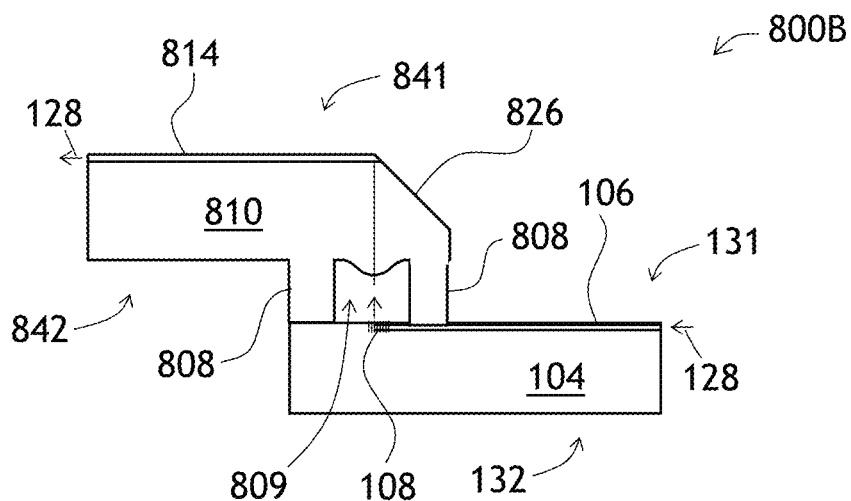
FIG. 8B illustrates a side cross-sectional view of the PLC of FIG. 8A including supporting side posts around the array of microlenses.

Referring to FIG. 8B with further reference to FIG. 8A, an optomechanical assembly 800B of FIG. 8B is a variant of the optomechanical assembly 800A of FIG. 8A. The optomechanical assembly 800B of FIG. 8B may further include a support 808 extending between the second surface 842 of the PLC 810 and the first surface 131 of the photonic chip 104, for supporting the PLC 810, and providing an air gap between the microlens array 809 and the gratings 108. The support 808 may take any suitable shape, e.g. rectangular, arcuate, and be formed by any suitable method, for example, by etching the PLC 810. The support 808 may also be formed on a separate wafer, which may be bonded to a wafer including the PLC 810, and then the two wafers (not shown) may be diced and polished as a unit.

Figure 9:
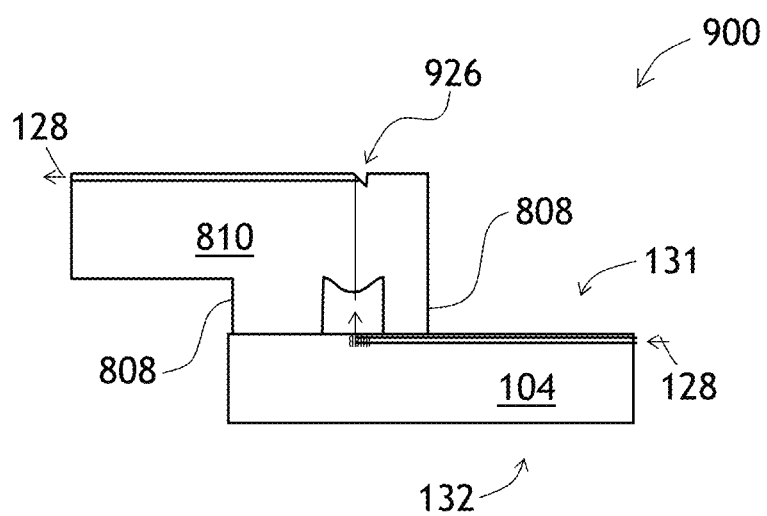
FIG. 9 illustrates a side cross-sectional view of an embodiment of the PLC of FIG. 8B, including a groove for reflecting light towards the PLC and the supporting side posts around the array of microlenses.

Referring now to FIG. 9 with further reference to FIG. 8B, an optomechanical assembly 900 is a variant of the optomechanical assembly 800B of FIG. 8B. The optomechanical assembly 900 of FIG. 9 may include a groove 926 extending across the plurality of PLC optical waveguides 814, instead of the slanted optical surface 826. The groove 926 may be formed lithographically, alleviating the need to angle-polish the PLC 810. As is readily apparent to the skilled person, this alternative could be applied in combination with any of the preceding embodiments in lieu of the slanted optical surfaces 126, 326 or 826.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An optomechanical assembly comprising:
   a substrate;
   a photonic chip (PC) supported by the substrate, the photonic chip comprising a plurality of PC optical waveguides and a plurality of vertical coupling gratings, wherein each vertical coupling grating is optically coupled to at least one of the plurality of PC optical waveguides;
   a first planar lightwave circuit (PLC) over the substrate, the first planar lightwave circuit comprising: first and second ends; at least one optical port at the first end; and a first plurality of PLC optical waveguides optically coupled to the at least one optical port and extending to the second end, wherein each one the first plurality of PLC optical waveguides is optically coupled at the second end to a respective one of the plurality of PC optical waveguides via a respective one of the plurality of vertical coupling gratings; and
   a fiber connector comprising a base comprising a connector mating side for mating with a removable connector; a substrate mounting side opposite the connector mating side; and an opening extending between the connector mating side and the substrate mounting side;
   wherein the substrate is attached to the substrate mounting side of the fiber connector base; and wherein the first end of the first planar lightwave circuit abuts the substrate mounting side, so that the at least one optical port of the first planar lightwave circuit is disposed against the opening for optical coupling to the removable connector.

2. The optomechanical assembly of claim 1, wherein the first planar lightwave circuit comprises a slanted optical surface at the second end thereof, disposed and oriented so as to couple light reflected by the plurality of vertical coupling gratings into the first plurality of PLC optical waveguides.

3. The optomechanical assembly of claim 2,
   wherein the photonic chip comprises opposed first and second surfaces, wherein the plurality of PC optical waveguides are disposed in or proximate the first surface of the photonic chip;
   wherein the first planar lightwave circuit comprises opposed first and second surfaces, wherein the first plurality of PLC optical waveguides are disposed in or proximate the second surface of the first planar lightwave circuit; and
   wherein the second surface of the first planar lightwave circuit is affixed to the first surface of the photonic chip.

4. The optomechanical assembly of claim 1, wherein the fiber connector further comprises a peripheral wall extending from the connector mating side of the base and defining a receptacle for receiving and registering therein the removable connector.

5. The optomechanical assembly of claim 1, wherein the photonic chip is electrically coupled to the substrate via a plurality of electrical connections.

6. The optomechanical assembly of claim 1, wherein the at least one optical port comprises a plurality of optical ports, wherein each optical port is optically coupled to a respective one of the first plurality of the PLC optical waveguides.

7. The optomechanical assembly of claim 6, wherein the opening is elongated, and wherein the plurality of optical ports is disposed on a straight line parallel to the elongated opening.

8. The optomechanical assembly of claim 7, further comprising an array of microlenses disposed in the elongated opening, wherein each microlens is optically coupled, to a respective one of the first plurality of the PLC optical waveguides.

9. The optomechanical assembly of claim 7, wherein the fiber connector comprises a multi-fiber push-on connector.

10. The optomechanical assembly of claim 3, further comprising a second planar lightwave circuit affixed to the first surface of the first planar lightwave circuit, the second planar lightwave circuit comprising first and second ends; at least one optical port at the first end of the second planar lightwave circuit; and a second plurality of PLC optical waveguides coupled to the at least one optical port of the second planar lightwave circuit and extending to the second end of the second planar lightwave circuit, wherein each one of the second plurality of the PLC optical waveguides is optically coupled at the second end of the second planar lightwave circuit to a respective one of the plurality of PC optical waveguides via the plurality of vertical coupling gratings;
   wherein the slanted optical surface extends along the second ends of the first and second planar lightwave circuits, and is disposed and oriented so as to couple light reflected by the plurality of vertical coupling gratings into the first and second plurality of PLC optical waveguides.

11. The optomechanical assembly of claim 1, wherein the photonic chip comprises an optical transmitter, an optical receiver, or both.

12. The optomechanical assembly of claim 11, wherein the photonic chip comprises silicon.

13. The optomechanical assembly of claim 1, wherein the photonic chip comprises an optical modulator.

14. The optomechanical assembly of claim 1, wherein the photonic chip comprises indium phosphide.

15. The optomechanical assembly of claim 1, wherein the at least one optical port comprises a first optical port, wherein the first planar lightwave circuit comprises an arrayed waveguide demultiplexor comprising an input waveguide optically coupled to the first optical port, and a plurality of output waveguides, wherein the first plurality of PLC optical waveguides comprises the plurality of output waveguides of the arrayed waveguide demultiplexor.

16. The optomechanical assembly of claim 15, wherein the at least one optical port further comprises a second optical port, wherein the first planar lightwave circuit further comprises an arrayed waveguide multiplexor comprising a plurality of input waveguides and an output waveguide coupled to the second optical port, wherein the first plurality of PLC optical waveguides further comprises the plurality of input waveguides of the arrayed waveguide multiplexor.

17. The optomechanical assembly of claim 2,
wherein the photonic chip comprises opposed first and second surfaces, wherein the plurality of PC optical waveguides are disposed in or proximate the first surface of the photonic chip;
wherein the first planar lightwave circuit comprises opposed first and second surfaces, wherein the first plurality of PLC optical waveguides are disposed in or proximate the first surface of the first planar lightwave circuit, wherein the second surface of the first planar lightwave circuit is facing the first surface of the photonic chip; and
wherein the first planar lightwave circuit further comprises a microlens array extending from the second surface thereof and disposed in an optical path between the slanted optical surface and the vertical coupling gratings for optically coupling each one of the first plurality of PLC optical waveguides to a respective one of the plurality of PC optical waveguides.

18. The optomechanical assembly of claim 17, wherein the first planar lightwave circuit further comprises a support extending between the second surface of the first planar lightwave circuit and the first surface of the photonic chip, for supporting the first planar lightwave circuit providing a gap between the vertical coupling gratings and the microlens array.

19. The optomechanical assembly of claim 1, wherein the first planar lightwave circuit comprises silicon.

20. The optomechanical assembly of claim 1, wherein the plurality of vertical coupling gratings comprise at least one polarization selective grating coupler.

21. An optomechanical assembly comprising:
a substrate;
a photonic chip (PC) supported by the substrate, the photonic chip comprising a plurality of PC optical waveguides and a plurality of vertical coupling gratings, wherein each vertical coupling grating is optically coupled to at least one of the plurality of PC optical waveguides;
a first planar lightwave circuit (PLC) over the substrate, the first planar lightwave circuit comprising: first and second ends; first and second optical ports at the first end; and a first plurality of PLC optical waveguides optically coupled to the first and second optical ports and extending to the second end, wherein each one the first plurality of PLC optical waveguides is optically coupled at the second end to a respective one of the plurality of PC optical waveguides via a respective one of the plurality of vertical coupling gratings;
a first optical fiber extending between first and second ends thereof and optically coupled at the first end to the first optical port;
a first mating sleeve optically coupled to the second end of the first optical fiber;
a second optical fiber extending between first and second ends thereof and optically coupled at the first end to the second optical port;
a second mating sleeve optically coupled to the second end of the second optical fiber; and
a housing supporting the substrate, the first mating sleeve, and the second mating sleeve.

22. The optomechanical assembly of claim 21, wherein the first planar lightwave circuit comprises an arrayed waveguide demultiplexor comprising an input waveguide optically coupled to the first optical port, and a plurality of output waveguides, wherein the first plurality of PLC optical waveguides comprises the plurality of output waveguides of the arrayed waveguide demultiplexor.

23. The optomechanical assembly of claim 21, wherein the first planar lightwave circuit further comprises an arrayed waveguide multiplexor comprising a plurality of input waveguides and an output waveguide coupled to the second optical port, wherein the first plurality of PLC optical waveguides further comprises the plurality of input waveguides of the arrayed waveguide multiplexor.

* * * * *